United States Patent [19]

Tabata et al.

[11] Patent Number: 5,317,116
[45] Date of Patent: May 31, 1994

[54] PULSE WELDING APPARATUS

[75] Inventors: Yoichiro Tabata; Shigeo Ueguri; Yoshihiro Ueda, all of Hyogo; Masanori Mizuno, Aichi; Yoshiaki Katou, Aichi; Osamu Nagano, Aichi, all of Japan

[73] Assignee: Mitsubishi Denki Kabushiki Kaisha, Tokyo, Japan

[21] Appl. No.: 668,519

[22] PCT Filed: Feb. 27, 1990

[86] PCT No.: PCT/JP90/00246
§ 371 Date: Mar. 27, 1991
§ 102(e) Date: Mar. 27, 1991

[87] PCT Pub. No.: WO91/01842
PCT Pub. Date: Feb. 21, 1991

[30] Foreign Application Priority Data

Aug. 2, 1989 [JP] Japan .................................. 1-200693
Aug. 2, 1989 [JP] Japan .................................. 1-200694
Sep. 6, 1989 [JP] Japan .................................. 1-231062

[51] Int. Cl.[5] .............................................. B23K 9/09
[52] U.S. Cl. ........................... 219/130.51; 219/130.31
[58] Field of Search ................... 219/130.51, 137 PS, 219/130.31

[56] References Cited

U.S. PATENT DOCUMENTS 4,758,707 7/1988 Ogilvie et al. .................. 219/130.51
4,994,646 2/1991 Tabata et al. .................. 219/130.51

FOREIGN PATENT DOCUMENTS 57-19177 12/1982 Japan .
62-54585 10/1987 Japan .
1254385 11/1989 Japan .

Primary Examiner—Clifford C. Shaw
Attorney, Agent, or Firm—Sughrue, Mion, Zinn, Macpeak & Seas

[57] ABSTRACT

A pulse welding apparatus using a pulse discharge such as a pulse arc welding apparatus and a short-circuit transfer arc welding apparatus. A pulse current waveform control circuit, which controls the pulse arc current so that a desired pulse arc current is supplied to the arc welding power supply for outputting the pulse arc current to the welding load unit, is constructed such that the optimum welding operation may be performed without having to adjust circuit components and modify circuit design. The pulse current waveform control circuit is in the form of a microcomputerized digital circuit which operates under a program to provide a desired pulse arc current. A modification of the program can provide any desired pulse arc currents without changing circuits. The optimum welding current waveform parameters or a target arc length signal is learned in the first welding stage and stored into a memory. An arc length feedback control or a current waveform control is performed under the control of program on the basis of the optimum welding current waveform parameters or the target arc length signal so as to control the faulty separation of globules when magnetic blow occurs and so as to reduce the variation of arc length due to external disturbances occurring at the welding torch so that improved welding quality is ensured under various environments.

6 Claims, 29 Drawing Sheets

(1) PULSE GROUP CURRENT SUPPLYING PERIOD (2) BASE CURRENT SUPPLYING PERIOD (1) PULSE GROUP CURRENT SUPPLYING PERIOD (2) SHORT-CIRCUIT CURRENT SUPPLYING PERIOD

|  | 1 | 2 | 3 | ...... | n | ...... | no |
|---|---|---|---|---|---|---|---|
| $I_P$ | $I_P(1)$ | $I_P(2)$ | $I_P(3)$ |  | $I_P(n)$ |  | $I_P(no)$ |
| $I_B$ | $I_B(1)$ | $I_B(2)$ | $I_B(3)$ |  | $I_B(n)$ |  | $I_B(no)$ |
| $\tau$ | $\tau(1)$ | $\tau(2)$ | $\tau(3)$ | ...... | $\tau(n)$ |  | $\tau(no)$ |
| $C_A$ | $C_A(1)$ | $C_A(2)$ | $C_A(3)$ | ...... | $C_A(n)$ |  | $C_A(no)$ |
| $L_0$ | $L_0(1)$ | $L_0(2)$ | $L_0(3)$ | ...... | $L_0(n)$ |  | $L_0(no)$ |

|  | $I_P(n,1)$ | $I_P(n,2)$ | --- | $I_P(n,n)$ | $I_B(n,1)$ | --- | $I_B(n,n)$ | $\tau(n,1)$ | --- | $\tau(n,n)$ | $C_A(n,n)$ | $C_A(n,n)$ |
|---|---|---|---|---|---|---|---|---|---|---|---|---|
| WELDING REGION 1 |  |  |  |  |  |  |  |  |  |  |  |  |
| WELDING REGION 2 |  |  |  |  |  |  |  |  |  |  |  |  |
| WELDING REGION 3 | $I_P(3,1)$ |  |  |  |  |  |  | $\tau(3,1)$ |  |  | $C_A(3,1)$ |  |
| ⋮ |  |  |  |  |  |  |  |  |  |  |  |  |
| WELDING REGION m |  |  |  | $I_P(n,n)$ |  |  | $I_B(n,n)$ |  |  | $\tau(n,n)$ |  | $C_A(n,n)$ |

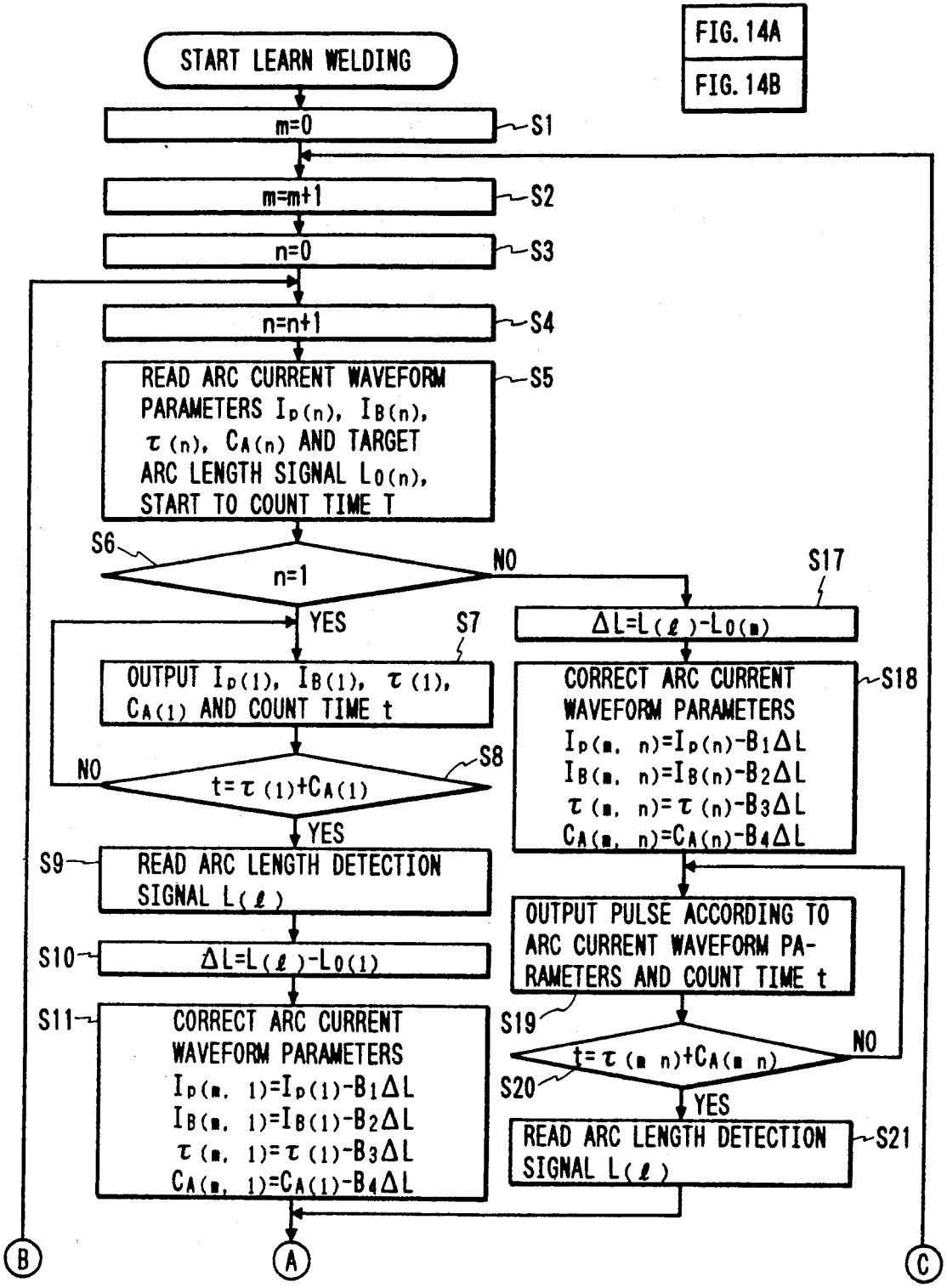

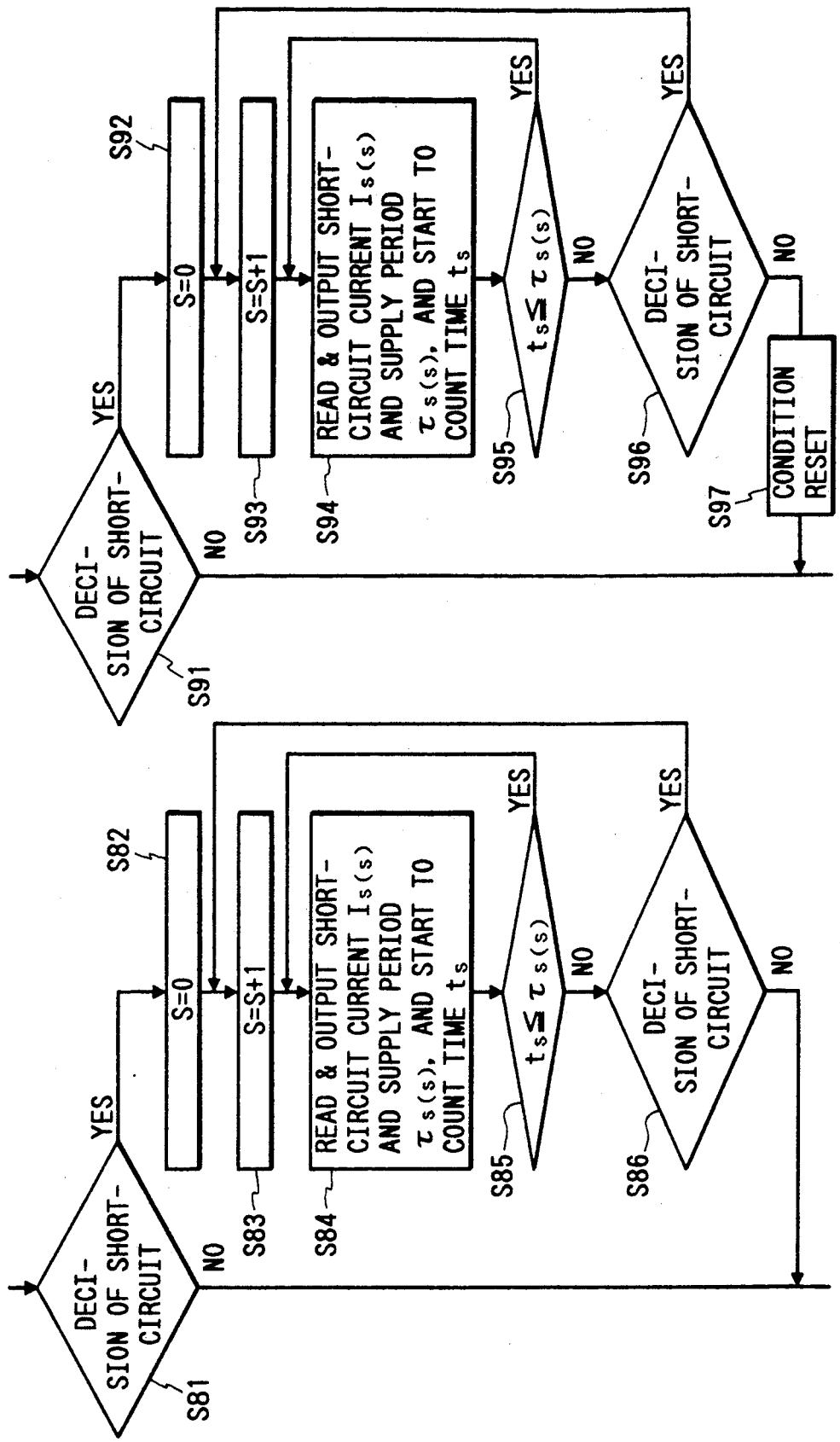

PULSE WELDING APPARATUS

TECHNICAL FIELD

The present invention relates to a pulse welding apparatus using a pulse discharge, and more particularly to a pulse welding apparatus in which phenomenon specific to welding such as the melting of a discharge electrode and separation thereof are controlled so as to obtain good quality of welding.

PRIOR ART

Examples of conventional pulse welding apparatus using the pulse discharge are a pulse arc welding apparatus disclosed by Japanese Patent Laid-Open No. 57-19177 and a short-circuit transfer arc welding apparatus disclosed by Japanese Patent Publication No. 62-54585.

In the pulse arc welding apparatus, a pulse arc current is run between the consuming welding wire electrode (hereinafter referred to as a wire electrode) and workpieces, and both the workpieces and the wire electrode are melted and then the wire electrode is cut by the electromagnetic pinch force produced by the pulse arc discharge, and the melted electrode or globule is then transferred to the workpieces (referred to a spray transfer). A pulse welding can be carried out even in a region where average current is less than that of a DC arc welding apparatus, and lends itself to the welding of thinner workpieces. The pulse welding has an advantage that the spray transfer serves to eliminate spatters produced during welding.

In the short circuit arc welding apparatus, short-circuiting is performed alternately with arcing in a periodic fashion so that the workpieces and the wire electrode are melted by the heat generated through the arc discharge developed by an arc current between the wire electrode and the workpieces and then the workpieces are short-circuited to the wire electrode so as to transfer the melted globules produced on the tip end of the wire electrode onto the workpieces. Periodically performing the short-circuiting alternately with arcing assures a stable welding operation.

In order to obtain the good quality of pulse arc welding, it is required that undercut, i.e., a defective shape of welding-bead, is prevented from being produced and the globules that separate from the electrode are held to substantially the same size. To prevent the spatters, the contact between the wire electrode and the workpieces should be prevented. To prevent undercut, the arc length should be short. In order to meet both of the requirements, it is important to ensure fine particles of globules (spray transfer) when the globules leave the electrode. For uniform size of globules, the uniform size of globules that separate from the electrode may be provided by periodically repeating pulse arc currents of the same pulse shapes.

In a shield gas of a mixture of argon gas and 20% $CO_2$ gas, the arc size is large enough to enclose the globules produced on the electrode so that the periodic simple pulses as shown in FIG. 24 ($\tau$:pulse width, $I_B$:base current) will help the globules become particles and separate from the electrode in a regular manner. However, in a shield gas of 100% $CO_2$ gas, the arc size is rather small to enclose the globules so that simple pulses causing phenomenon as depicted by (a) and (b) in FIG. 24, which does not ensure good welding results. Narrower pulse widths $\tau$ provided by high position of the base current $I_B$ as depicted by (a) in FIG. 24 will change the shape of globules produced on the tip end of electrode from Po state to Pa1 state and then to Pa2 state where the globules are large enough to be separated from the electrode. On the other hand, wider pulse widths $\tau$ provided by low position of the base current $I_B$ will cause the electromagnetic force F due to pulse currents to be upward, which in turn causes the shape of globules on the tip end of wire electrode to become from Po state to Pb1 state where the globules are constricted and lifted. Then, the globules become as shown by Pb2 state so that the globules are separated by pulse currents. But the thus separated globules will spin at high speeds not to fall onto the workpieces but to be scattered as spatters to places other than the welding point or to again be deposited on the electrode as depicted by Pb2' state. Since the conventional pulse welding apparatus operate as mentioned above, it suffers from the following problems.

When the peak level $I_P$ of the pulse current is low, the globules on the tip end of wire electrode are lifted up not allowing the separation of globules till globules grow large. Thus, the electrode is shortcircuited to the workpieces body through the globules that have grown large. Also the spatters scatter all over the place during welding operation or undercut or defective beads are resulted. Furthermore, when the peak level Ip of the pulse current is high, there are problems to lead to a larger capacity and a more weight of the power supply unit, which causes a sharp increase in cost.

Japanese Patent Laid-Open No. Hei 1-254385 (Japanese Patent Application No. 62-309388 and No. 63-65083) discloses the inventor's pulse welding apparatus in which a pulse current waveform is divided into a group of pulse currents which are spaced by one or more than one pulse intervals, the groups are outputted at predetermined periods, and a continuous base current is superimposed to the groups of pulse currents to provide a discharge current waveform. By this arrangement, the globules transferred to the workpieces are converted into particles so that the globules are transferred in a regular fashion.

As shown in FIG. 25, in the prior pulse welding apparatus Japanese Patent Laid-Open No. Hei. 1-254385, a pulse current waveform is formed of a plurality of pulse current and periodically repeated to form an entire discharge current waveform. This means that a single pulse is divided into a plurality of pulses. The division of a pulse causes the upward electromagnetic force on the wire electrode resulting from the pulse arc discharge to be intermittent, thereby, reducing the force tending to lift the globule on the electrode. Therefore, the globules are easily separated from the electrode before they grow big not only in an argon-dominated shielding gas but also in 100% $CO_2$ shielding gas.

The transfer of globules will be explained below. As shown in FIG. 25, when a pulse arc current having a pulse width $\tau$ and a period $C_A$ is run periodically through the wire electrode, the globules produced on the electrode undergo "growth" and then "separation from the electrode" in a cyclic fashion. That is, a sufficient amount of globule produced on the electrode during the early period of pulse group undergoes vibration due to the arc discharge at the frequency of the pulses, and separates from the electrode. After the globule has separated, a new globule is produced by pulses on the tip end of wire electrode and grows while being lifted up by the electromagnetic force. Subsequently, the globule hangs from the wire tip during the base period to shape up before the next group of pulses begins.

However, when performing arc welding while moving the wire electrode which produces an arc above the workpieces in a certain direction, the following 2 problems should be solved before welding operation can be carried out under various conditions in wide ranges of applications.

(1) The arc is blown by the electromagnetic force generated by an arc current and the magnetic field due to the arc current, which is called "magnetic blow"; disturbing the regular transfer of globules.

(2) The poor quality of welding results from the variations of arc length due to external disturbances including movement of a welding torch in air, deformation of the workpieces, changes in wire-supplying speed due to the change in looseness of wire in the wire conduit, the wear of a feeding chip, and the variations in energy feeding point on the workpieces due to the tendency of curving thereof.

Analyzing the first problem (1), when carrying out a welding operation while moving the wire electrode that produces an arc above the workpieces in a certain direction, the distribution of magnetic field produced in air depends on the current path, i.e., from torch to arc and then from arc to workpieces. The shape of welding joints and different grounding points determine the distribution of magnetic field in air. The electromagnetic force acting on the arc depends on the distribution of magnetic field and the direction of arc current, causing magnetic blow where the arc is tilted with respect to the workpieces. This magnetic blow results from the construction of the workpieces and the grounding points, which appears - repeatedly if the construction of the workpieces and the grounding points are the same.

As depicted by the respective globule separation process (A-1) to (C-1) and (A-3) to (C-3) in FIG. 26, the arc length becomes long due to the fact that the globules are lifted by the deflected arc, which disturbs the regular separation of globules and causes the separated globules not to fall onto the beads.

As to the item (2), the variation of wiresupplying speed due to the vibration of the welding torch and the variation of looseness of wire electrode in the wire conduit directly cause the arc length to vary; greater arc lengths result in undercut in beads and shorter arc lengths cause spatters. As shown in FIG. 27(a)–(c), the distortion of workpieces and the external disturbances such as a decrease in feeding chip and the tendency of curving of wire electrode cause the change in heating the electrode of a length Ex (projecting portion) between electric energy feeding point and the tip end of wire electrode by Joule heat, which in turn causes the difference between the wiresupplying speed and the welding speed of the tip end of wire electrode. This indirectly causes the arc length to change. The change in arc length results in the undercuts and spatters. In other words, (1) is a steady problem that depends on the specific construction of workpieces and grounding points, but (2) is an unstable problem varying with each moment.

Likewise in the short-circuit arc welding apparatus, as shown in FIG. 28 S1a to S3a, when a magnetic blow occurs, the arc is deflected by the magnetic blow and therefore the globules grown on the tip end of wire electrode are lifted up to change the time length of short-circuiting of globules. This affects the alternate periodic transition between short-circuiting and arc. Thus, beads may have unevenness on its surface or the depth of beads may vary, failing to ensure the welding strength.

In the conventional pulse welding apparatus, a pulse current waveform control circuit controllably outputs a desired pulse arc current to an arc welding power supply unit, which supplies the welding load with pulse arc currents. The control circuit usually takes the form of an analog circuit. Thus, if, for example, a comparing circuit is to be incorporated, there will be many adjusting elements for adjusting the amplifications of amplifiers and offset voltages as well as a large number of components. Additionally, for example, when changing the number of pulses in the pulse current group or the peak values of pulse currents, it is necessary to change the values of circuit components or to provide some additional circuits. This is a problem in terms of time and cost.

SUMMARY OF THE INVENTION

The present invention was made in view of the aforementioned drawbacks and provides an inexpensive apparatus by reducing the adjusting elements and the number of components. A first object of the invention is to provide a pulse welding apparatus which has a pulse group current waveform control circuit in the form of a microcomputerized digital circuit by which an arbitrary current waveform is easily implemented whenever such a current waveform is required.

A second object of the invention is to provide a short-circuit-transfer-type pulse welding apparatus which has a pulse current control circuit in the form of a microcomputerized digital circuit capable of preventing defective welding due to magnetic blow under various welding conditions and environment as well as undercut and spatters caused by external disturbances to the welding torch, and which involves short-circuit transfer In order to achieve the aforementioned first object, a first inventive aspect is to provide a pulse welding apparatus in which a current that causes the workpieces to melt is supplied alternately with a base current or a short-circuit current to a welding load so as to perform welding operation, CHARACTERIZED by an arc welding power supply unit for supplying pulse currents to the welding load, in which one waveform of said pulse current is further divided into a group of pulse currents which has at least one pulse width and at least one pulse interval, which is obtained to periodically repeat said group of pulse currents and to superpose with a continuous base current;

voltage detecting circuit for detecting the output of the arc welding power supply unit;

a smoothing circuit for receiving the output signal of the voltage detecting circuit;

a voltage setting circuit for setting a desired output voltage; and a microcomputerized digital circuit including, a digital/analog converter circuit for outputting a voltage signal corresponding to a desired output current to the aforementioned arc welding power supply unit, a first analog/digital converter circuit for receiving the output signal of the voltage setting circuit, a second analog/digital converter circuit for receiving the output signal of the aforementioned smoothing circuit, a data latch circuit having a multiple bits output signal lines connected with a multiple bits input signal lines of the digital analog converter circuit, a CPU having a data bus connected commonly to the multiple bits input signal lines of the data latch circuit, the multiple bits output signal lines of the first analog digital converter circuit, and the multiple bits output signal lines of the second analog digital converter circuit, wherein the CPU has an algorithm in which a digital data $V_{FBA}$ corresponding to an average output voltage of the arc welding power supply is compared with a digital data Vset corresponding to a desired output voltage at predetermined time intervals so as to hold the base current or short-circuit current, or to output a current that melts the workpieces.

A circuit which controls the arc length so as to vary the arc length in a regular fashion, and another circuit which alternately outputs the pulse currents with the base current or a short-circuit current, are formed as the microcomputerized digital circuit. Each circuit acts under a program thereof. Therefore, the present invention provides for the elimination of the adjusting elements in the circuits to reduce the number of components and the adjusting time for low cost. This allows not only an arbitrary current waveform to be provided but also an arbitrary control operation to be implemented by modifying the program rather than changing the circuit configuration. Furthermore, since the discharge current waveform is formed as the pulse current group, the division of the pulse current waveform causes the upward electromagnetic force on the wire electrode resulting from the pulse arc discharge to be intermittent, thereby reducing the force tending to lift the globule on the electrode. Therefore, the globules are easily separated from the electrode before they grow big without regard to the kind of shielding gas.

In order to achieve the first object, in addition to the structural elements of the first inventive aspect, a second inventive aspect comprises a third analog digital converter circuit that has a multiple bits output signal lines connected to the data bus which is connected to the data bus, and receives the output of the voltage detecting circuit. And while the arc welding power supply unit outputs the base- current or short-circuit current, the CPU performs operations according to the aforementioned algorithm at predetermined intervals, as well as compares a digital data $V_{FBM}$ corresponding to a momentary output voltage of the arc welding power unit with a digital data Vmax in which the character is Vmax>Vset corresponding to the predetermined digital data Vset. The CPU holds the base current or short-circuit current if $V_{FBM}<$Vmax, and the CPU output a second base current greater than the base current or short-circuit current only when $V_{FBM}\geqq$Vmax. The second inventive aspect makes it possible to implement a circuit, which prevents magnetic blow while the base current or short-circuit current is flowing during pulse arc welding operation, by arranging the operation such that when the output voltage exceeds the setting Vmax during the supply of base current (or short-circuit current), the second base current or short-circuit current is run: In addition to the effects of the first inventive aspect, this is advantageous in that a commonly known magnetic-blowpreventing circuit can easily be provided In order to achieve the second object, a third to tenth inventive aspects were made.

The third inventive aspect comprises:

an arc length detector for detecting a signal indicative of the arc length between the wire tip end and the workpieces;

a microcomputerized digital circuit including a target arc length memory for storing therein a target arc length signal indicative of the pulse current group, an arc current waveform memory for storing arc current waveform parameters including respective peak values of the pulse current group, base current, pulse widths, and pulse interval, and a calculating unit for correcting the current waveform parameters on the basis of difference between the detected-arc-length signal and the target-arc-length signal to output an arc current signal whose waveform of pulse current group is controlled; wherein the calculating unit having an algorithm which includes storing means for storing into the arc current waveform memory the arc current waveform parameters whose waveforms are controlled in accordance with a welding area in a first welding stage, and control means for reading out, in a second welding stage, the thus stored arc current waveform parameters corresponding to the respective welding areas and for controllably increasing or decreasing the thus read current waveform parameters on the basis of the difference between the detected-arc-length signal and the target-arc-length signal.

Thus, in addition to the effects of the first and second inventive aspects, the third inventive aspect eliminates the variation of arc lengths due to magnetic blow in the first welding stage so as to reduce the faulty of separation of the globules caused by the magnetic blow. This provides "learned" waveform parameters of welding current which are adjusted to actual effects of magnetic blow occurring in the respective welding regions. Feedback-controlling the arc length with reference to the welding current waveform learned in the first welding stage, reduces the faulty separation of globules due to magnetic blow as well as the variations of arc length in the welding torch due to external disturbances, thereby improving welding quality under various welding conditions.

A fourth inventive aspect comprises, in addition to the structural elements of the third inventive aspect, a short-circuit detector for detecting short-circuiting and a short-circuit current waveform memory for storing a short-circuit current to be supplied when short-circuit occurs. The calculating unit has the algorithm in which the short-circuit current is read out from the short-circuit current waveform memory and is supplied to the welding load. A predetermined current waveform is split into a short-circuit current waveform and an arc current waveform. When a sudden short-circuiting occurs due to external disturbances during the regular welding, the current waveform is immediately switched to the short-circuit waveform. Thus, in addition to the effects derived from the third inventive aspect, the fourth inventive aspect is effective in performing high quality welding operation.

A fifth inventive aspect is of the same construction as the fourth inventive aspect. The calculating unit has the algorithm in which upon the detection signal from the short-circuit detector, the short-circuit current is read out from the short-circuit current waveform memory and the short-circuit current waveform is supplied to the welding load, and when the short-circuit removal signal is issued from the short-circuit detector, the arc current waveform is reset and then the arc current waveform is supplied to the welding load. When the short-circuit occurs, the short-circuit current is run immediately and after the short-circuit is removed the arc current waveform is once reset before supplying the arc current waveform to the welding load. Thus, the same effects as in the third inventive aspect are obtained in the short-circuit transfer arc welding.

A sixth inventive aspect has, in addition to the construction in the third and fourth inventive aspects, a separation detector for detecting the separation of the globules produced on the tip end of wire electrode. The calculating unit has an algorithm in which during the regular welding as the second welding stage, the amount of charge of current after separation is detected on the basis of the waveform barometer of the welding current "learned" in the first welding stage in response to the detection signal from the separation detector so that a minimum base current is supplied when the amount of charge exceeds a predetermined value. In addition to the effects derived from the third and fourth inventive aspects, the sixth inventive aspect has advantages in which a uniform separation amount of globule may be achieved for performing welding operation in a regular manner by detecting the amount of charge of current at a time when the separation has begun and by decreasing the current when the detected charge amount reaches a predetermined value.

In addition to the construction in the third inventive aspect, a seventh inventive aspect has an algorithm which includes a storage means for storing into the target arc length memory the target arc length signal corrected in accordance with the detected arc length signal when welding is performed through the use a current waveform according to the arc current waveform parameters which are preset in the first welding stage, and a control means which reads out the "learned" target arc length signal and the arc current waveform parameters stored in the second welding, and then increases or decreases the arc current parameters in accordance with the difference between the detected arc length signal and the learned target arc length signal. Thus, in addition to the effects derived from the first and second inventive aspects, the seventh inventive aspect is advantageous in that in the first welding stage the seventh inventive aspect eliminates the effects of the variation of arc length due to magnetic blow to reduce faulty separation of globule. The seventh inventive aspect makes it possible to obtain the learned target arc length signal which has taken the magnetic blow in the respective welding area into account. Controlling the current waveform with reference to the target arc length learned in the first welding stage, can reduce not only the faulty separation of globule due to magnetic blow but also the variation of arc length due to external disturbances occurring at the welding torch. Thus, the improvement in welding quality may be assured under various welding conditions.

In addition to the construction of the seventh inventive aspect, an eighth inventive aspect has a short-circuit detector for detecting short-circuit. The calculating unit has an algorithm in which the short-circuit current stored in the short-circuit current waveform memory is read out in response to the detection signal from the short-circuit detector, and then the short-circuit current waveform is supplied. A predetermined current waveform is split into the short-circuit current waveform and the arc current waveform. This allows to immediately switch to the short-circuit current waveform when a sudden short-circuiting occurs due to external disturbances when performing regular welding. Thus, in addition to the effects derived from the seventh inventive aspect, the eighth inventive aspect is capable of performing good welding operation with improved quality of products.

The ninth inventive aspect has the same structural elements as in the eighth inventive aspect. The calculating unit includes an algorithm in which the short-circuit current stored in the short-circuit current waveform memory is read out in response to the detection signal from the short-circuit detector and is supplied, and the arc current waveform is reset before resuming the supply of arc current waveform when the short-circuit removal signal is issued from the short-circuit detector When a short-circuit occurs, the short-circuit current is immediately supplied and after the short-circuit is removed the arc current waveform is reset to supply the arc current waveform. Thus, the eighth inventive aspect provides the same effects as in the seventh inventive aspect in short-circuit transfer arc welding.

In addition to the construction of the seventh and eighth inventive aspects, a tenth inventive aspect has a separation detector for detecting the separation of globules produced on the tip end of wire electrode. The calculating unit has an algorithm in which when performing the second welding stage, the charge amount of current after separation is detected in response to the detection signal on the basis of the waveform barometer of welding current learned in the first welding so as to supply a minimum base current when the charge amount exceeds a predetermined value. Thus, in addition to the effects derived from the seventh and eighth inventive aspect, the amount of globules when separating may be made substantially constant by detecting the amount of charge of current based on a time when separation occurs and decreasing the current when the detected amount of charge reaches a predetermined value. Thus, welding may be carried out in a regular fashion.

BRIEF DESCRIPTION OF THE DRAWINGS

FIGS. 14A, 14B and 15A, 15B are flowcharts of the operation of a calculating unit (88) when the first and second welding stages of the third inventive aspect are performed;

FIG. 21 is a flowchart of the calculating unit (88) according to an eighth inventive aspect;

FIG. 22 is a flowchart of the calculating unit (88) according to a ninth inventive aspect;

BEST MODE OF EMBODIMENT OF THE INVENTION

Figure 1:
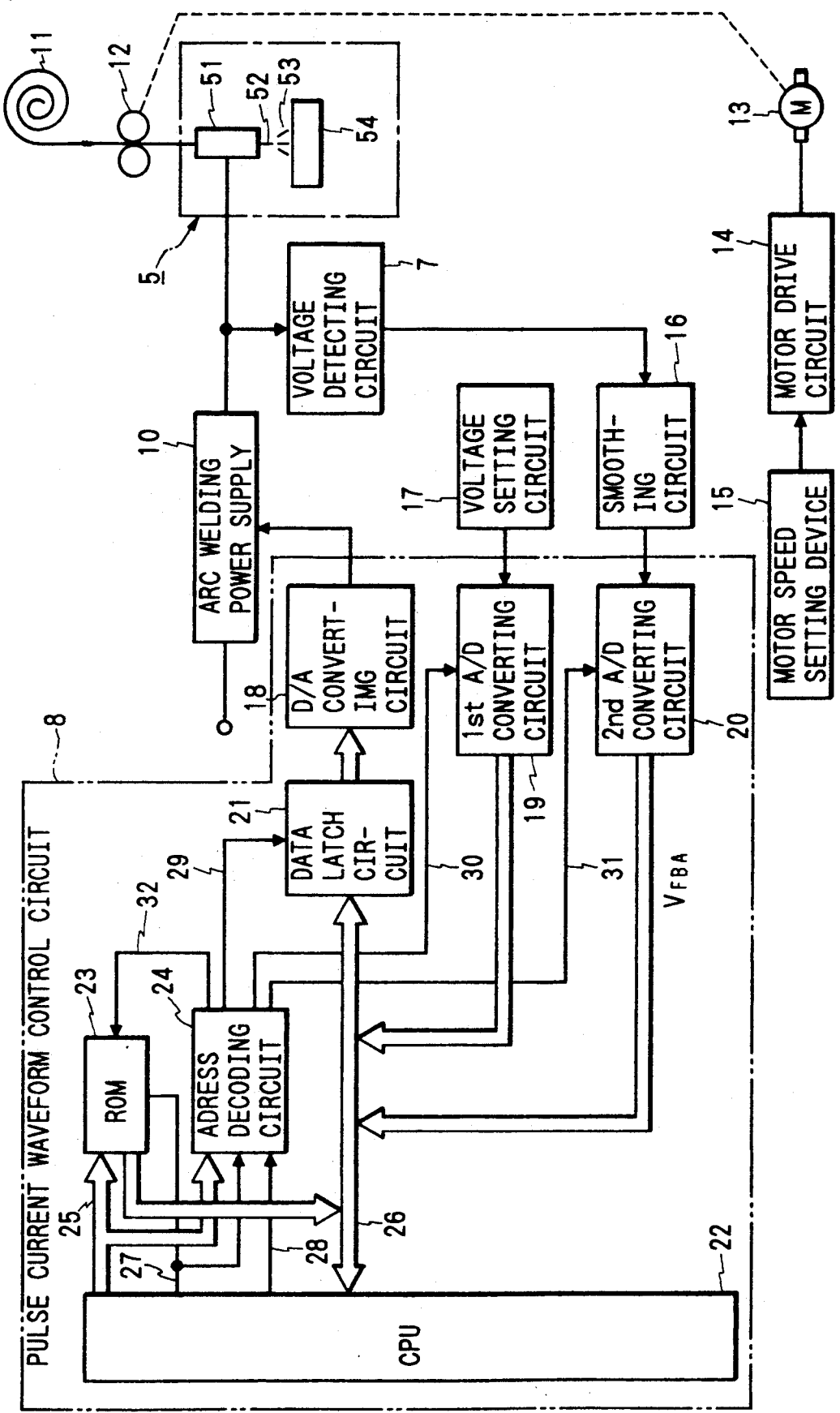
FIG. 1 is a block diagram showing an embodiment of a pulse welding apparatus according to a first inventive aspect.

FIG. 1 shows a construction of an embodiment of a pulse welding apparatus according to a first inventive aspect. In the figure, reference numeral 10 is an arc welding power supply unit that includes an inverter circuit, high frequency transformer, and high frequency diodes, all being controllably driven by an inverter drive circuit. Reference numeral 5 denotes an arc load which includes a welding torch 51, a wire electrode 52 to which wire electrode is supplied in the form of wire from the wire reel, an arc discharge 53, and workpieces 54. Inverter-controlled desired pulse groups are supplied through the high frequency transformer and high frequency diodes from the inverter circuit having the arc welding power supply 10 to the welding torch 51 for arc welding operation.

Reference numeral 11 is a consuming electrode (hereafter referred to as a wire) and reference numeral 12 is a wire supplying roller for supplying the wire 11. Reference numeral 13 is a wire supplying motor mechanically connected to the wire supplying roller 12 through gears. Reference numeral 14 is a motor drive circuit connected to a wire supplying motor 13, and reference numeral 15 is a motor speed setting circuit connected to the motor drive circuit. Reference 7 is a voltage detecting circuit connected to an output terminal of the arc welding power supply 10 and reference numeral 16 is a smoothing circuit that receives the output of the voltage detecting circuit 7. Reference 17 shows a voltage setting circuit. The pulse current waveform control circuit 8 receives the detected value from the voltage detecting circuit 7 via the smoothing circuit 16 and the setting value of the voltage setting circuit 17 so as to control the waveform of pulse current groups outputted from the arc welding power supply 10.

The aforesaid pulse current waveform control circuit 8 is provided with a D/A converting circuit 18 for outputting a voltage signal corresponding to a desired output current to the arc welding power supply unit 10, a first A/D converting circuit 19 that receives the output signal of the voltage setting circuit 17, a second A/D converting circuit 20 that receives the output signal of the smoothing circuit 16, a data latch circuit 21 connected to a plurality of data input line of the D/A converting circuit, a CPU 22, a ROM 23, and an address decoder circuit 24. The control circuit 8 is a microcomputerized digital circuit. Reference numeral 25 is an address bus for the CPU, reference numeral 26 is a data bus for the CPU, reference numeral 27 is a read signal outputted from the CPU, and reference numeral 28 is a write signal outputted from the CPU. Reference numerals 29-32 are a data latch circuit selection signal, a first A/D converting circuit selection signal, a second A/D converting circuit selection signal, and a ROM selection signal, respectively. The CPU 22 is connected via a common data bus 26 with multibit input signal lines of the data latch circuit 21, multibit input signal lines of the first A/D converting circuit 19, and multibit input signal lines of the second A/D converting circuit 20. The CPU 22 operates according to an algorithm, when the arc welding power supply unit 10 outputs the base current or the short-circuit current, in which a digital data $V_{FBA}$ indicative of an average output voltage of the arc welding power supply unit is compared with a digital data Vset indicative of a desired output voltage at predetermined time intervals so as to output a base current or a short-circuit current, or a current for melting the workpieces instead of a base current or short-circuit current.

Figure 2A:
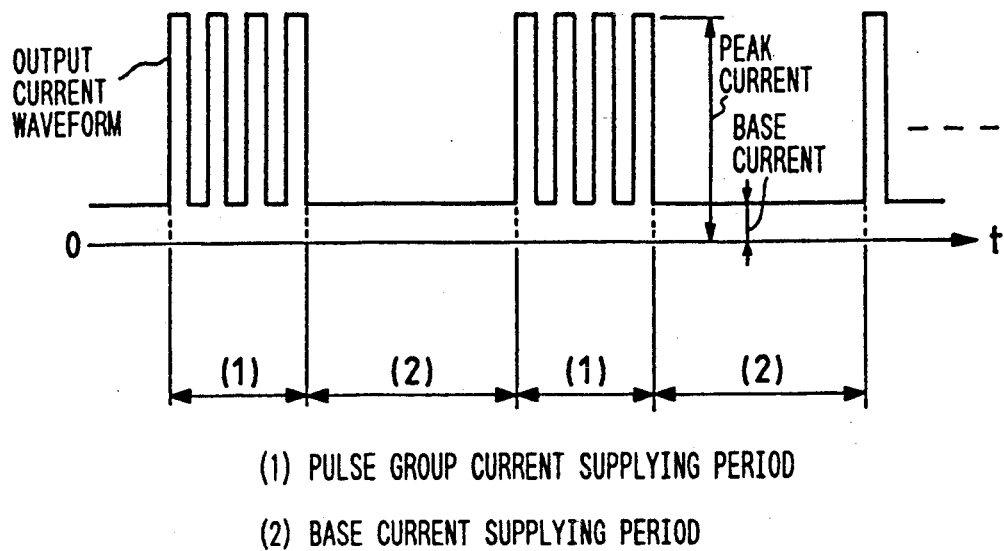
FIGS. 2(a) and 2(b) are illustrative diagrams illustrating the waveform of an output current of the arc welding power supply unit in FIG. 1, supplied to an arc load.
Figure 2B:
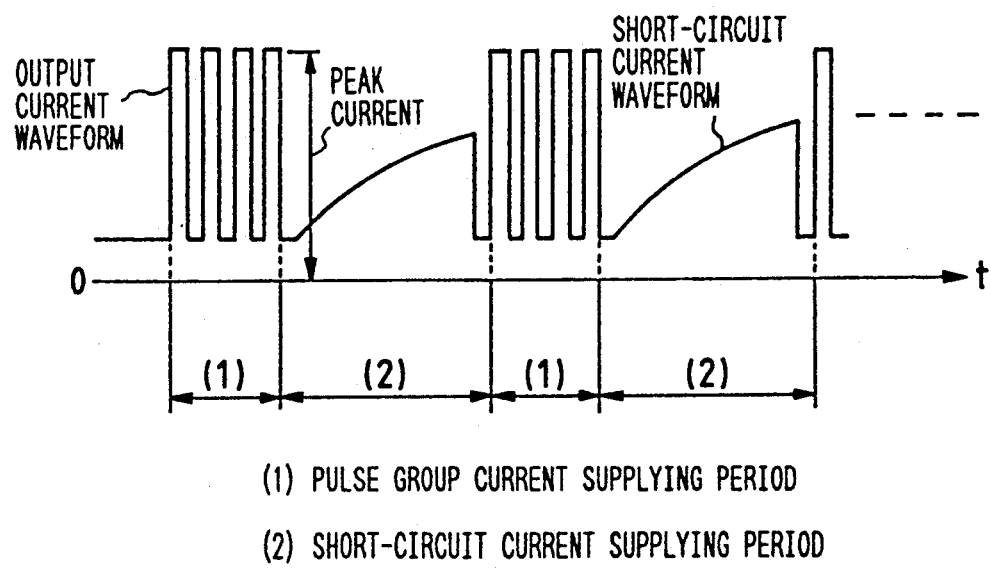

The operation of the present invention will now be described. In FIG. 1, the arc welding power supply unit 10 outputs to the arc 53 the pulse group current alternately with the base current or short-circuit current so as to perform pulse arc welding. FIGS. 2(a) and 2(b) are illustrative diagrams illustrating the waveform of the output current, (1) representing the period for pulse group current, (2) indicating the period during which the base current or short-circuit current is outputted.

ROM 23 contains a program for controlling the operation in which a voltage signal indicative of a desired output current is outputted, and in which the average output voltage of the arc welding power supply 10 is controllably held.

FIGS. 3(a and 3(b) are flowcharts showing the steps of the program executed by the CPU. In the figures, (a) shows the control when the base current is outputted and (b) shows the control when short-circuit current is outputted. These controls are performed at predetermined time intervals as an interrupt program of the main program shown.

A voltage signal indicative of the average output voltage of the arc welding power supply unit 10, which is outputted via the voltage detecting circuit 7 and the smoothing circuit 16 while the current or short-circuit current is being supplied (Sa1, Sb1), is converted into a digital data by the second A/D converting circuit 20 at predetermined time spaces under the control of the program stored in the ROM 23. The selection signal 31 is obtained through the address decoding circuit 24 which decodes the address data and the read signal 27 of the CPU 22 outputted onto the address data and the read signal 27 of the CPU 22 outputted onto the address bus 25. The selection signal serves as a start signal of the second A/D converting circuit 20 as well as a sampling signal (Sa2, Sb2) for a sample-and-hold circuit incorporated in the second A/D converting circuit 20.

The thus obtained digital data $V_{FBA}$ indicative of the average output voltage is inputted into the CPU 22 via the data bus 26 (Sa3, Sb3) to be compared with the digital data Vset prestored in the CPU 22 (Sa4, Sb4).

When supplying the welding load 5 with a waveform shown in FIG. 2(a), a digital data $I_{base}$ indicative of the base current is outputted to the data latch circuit 21 if $V_{FBA} \leq$ Vset (Sa5), and a data indicative of the pulse current group is outputted to the data latch circuit 21 if $V_{FBA}<$Vset (Sa6, Sa7).

When supplying the welding load unit with the waveform shown in FIG. 2(b), the digital data $I_{base}$ indicative of the short-circuit current is outputted to the data latch circuit 21 if $V_{FBA} \leq$Vset (Sb5), and a data indicative of the pulse current group is outputted to the data latch circuit 21 if $V_{FBA}>$Vset (Sb6, Sb7).

Figure 3A:
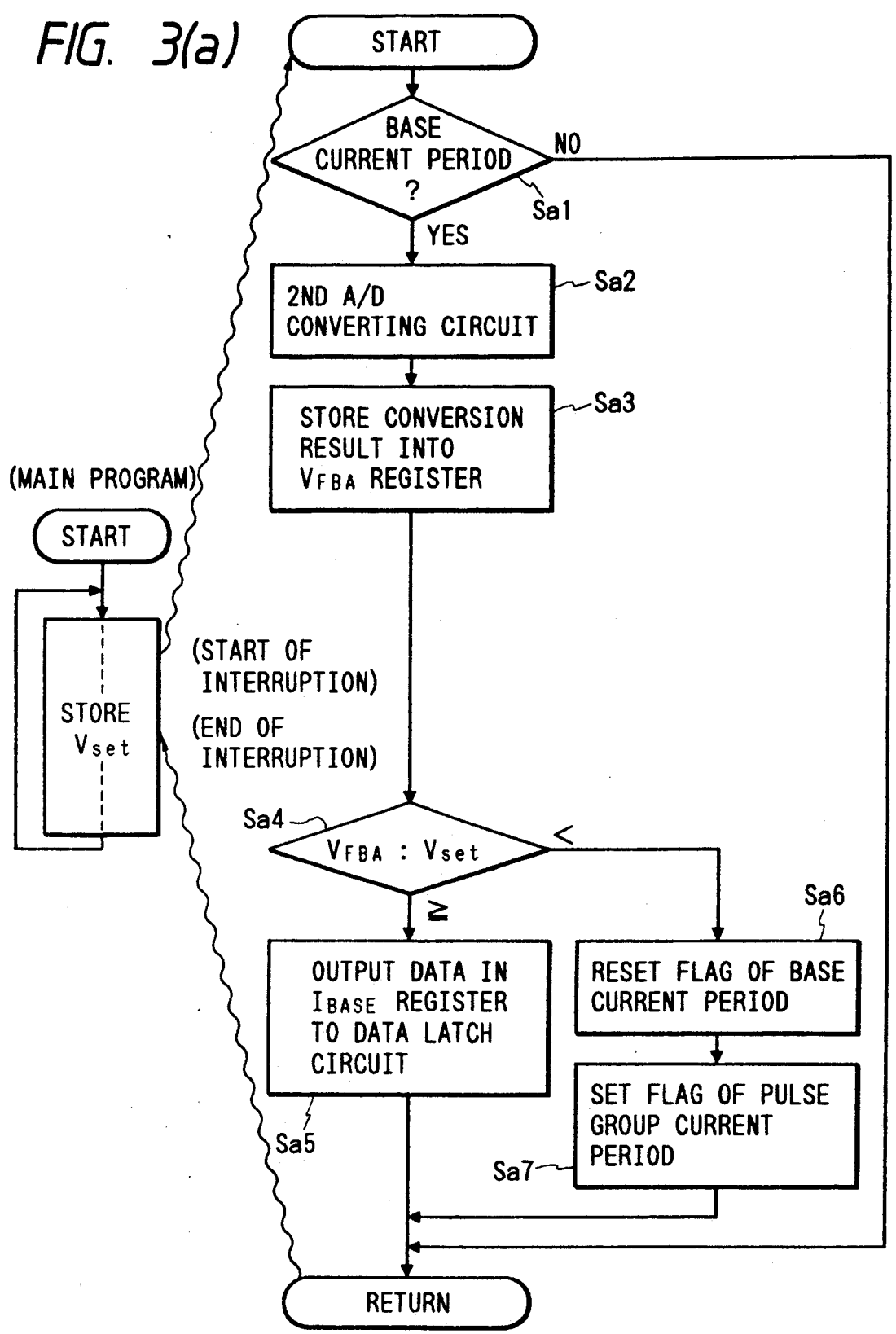
FIGS. 3(a) and (b) are flowcharts of a program under which a CPU performs a control operation for the apparatus in FIG. 1.
Figure 3B:
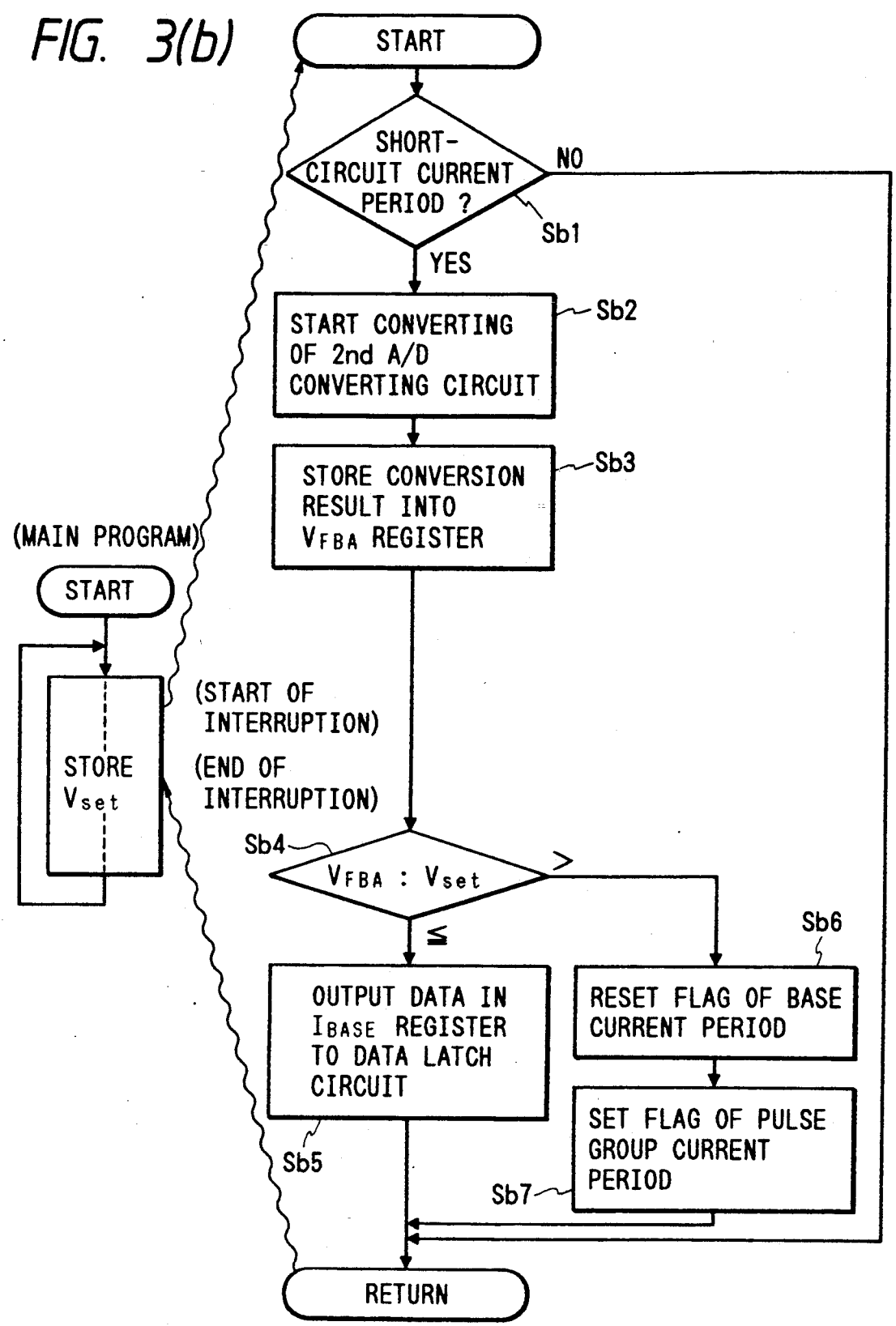

In FIGS. 3(a) and 3(b), the digital data Vset is set within the main program and indicates the output signal of the voltage setting circuit 17 in FIG. 1. The output signal of the voltage setting circuit 17 is converted into a digital data by the first A/D converting circuit 19 and is inputted into the CPU 22 via the data bus 26 so that the digital data is stored into a register therewithin. The above-mentioned signal processing is carried out under the main program.

In FIG. 1, the data latch circuit selecting signal 29 is outputted from the address decoding circuit 24 in combination with the address data and write signal 28 outputted onto the address bus 25. The signal 29 serves as a clock pulse for a plurality of flip flops that form a data latch 21 so as to latch the data indicative of the base current or pulse group current outputted onto the data bus 26 of the CPU 22. The data held on the plurality of output signal lines of the data latch circuit 21 is converted by the D/A converter 18 into an analog voltage which is outputted to the arc welding power supply unit 10, which in turn provides a desired output current.

In FIG. 1, the first A/D converting circuit selection signal 30 is obtained by decoding the address data outputted onto address bus 25 and the read signal 27 outputted from the CPU 22 by the address decoder 24. The first A/D converting circuit selection signal 30 serves as a sampling signal for the sample-and-hold circuit in the first A/D converting circuit 19 and a start signal for the first A/D converting circuit 19. The ROM selecting signal 32 is a signal obtained by decoding the address data outputted onto the address bus 25 and the read signal 27 by the address decoder circuit 24, and functions as a CE signal for the ROM 23.

Figure 4:
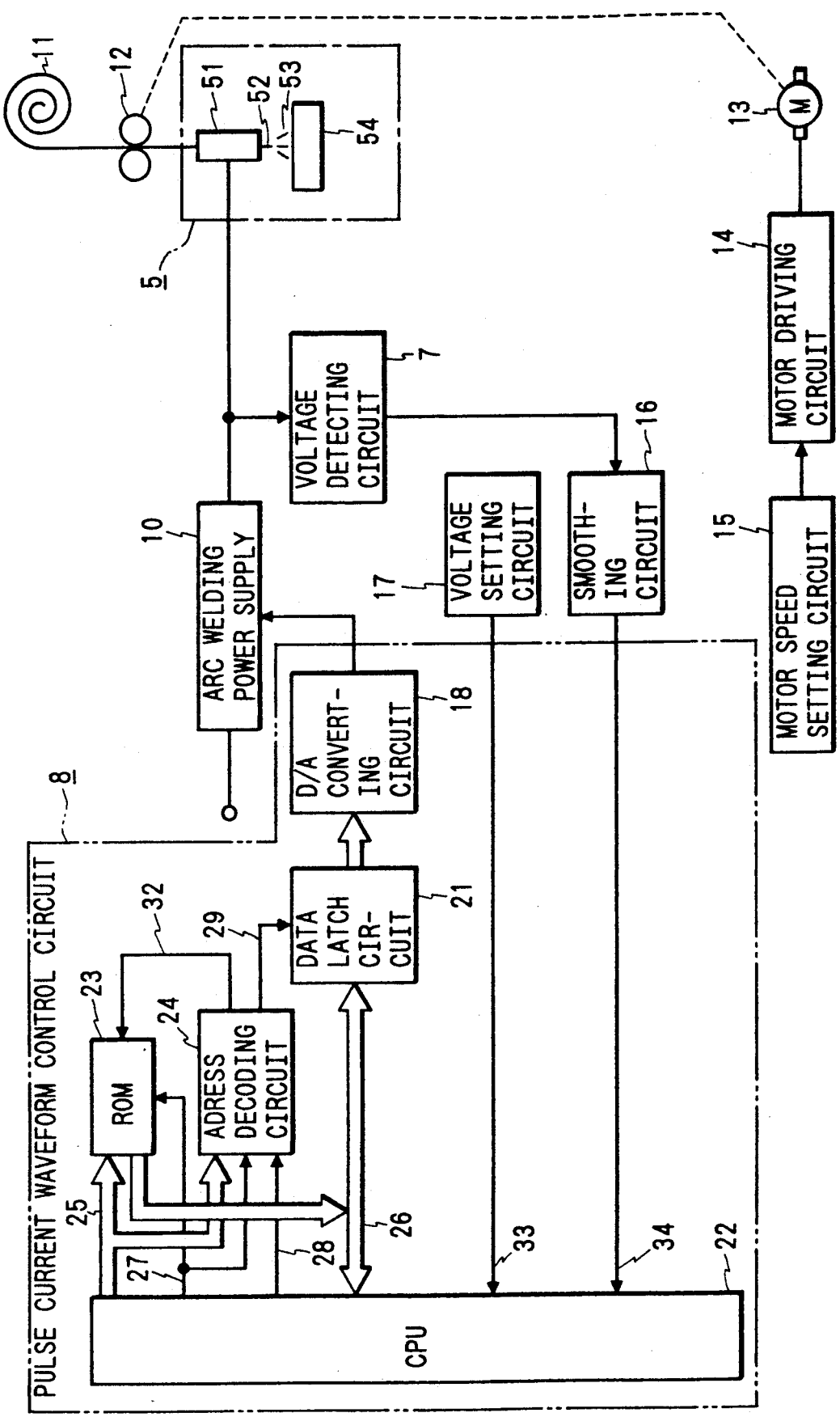
FIGS. 4, 5, and 6 are block diagrams showing other embodiments of a pulse welding apparatus according to the first inventive aspect.

FIG. 4 is a block diagram showing another embodiment of the first inventive aspect. In FIG. 4, the CPU 22 is constructed of a single-chip CPU incorporating at least more than one A/D converting circuits. Reference numeral 33 is a first analog input port and reference numeral 34 is a second analog input port. The apparatus of the construction in FIG. 4 will also perform an operation similar to the embodiment in FIG. 1 under the program shown in FIG. 3.

Figure 5:
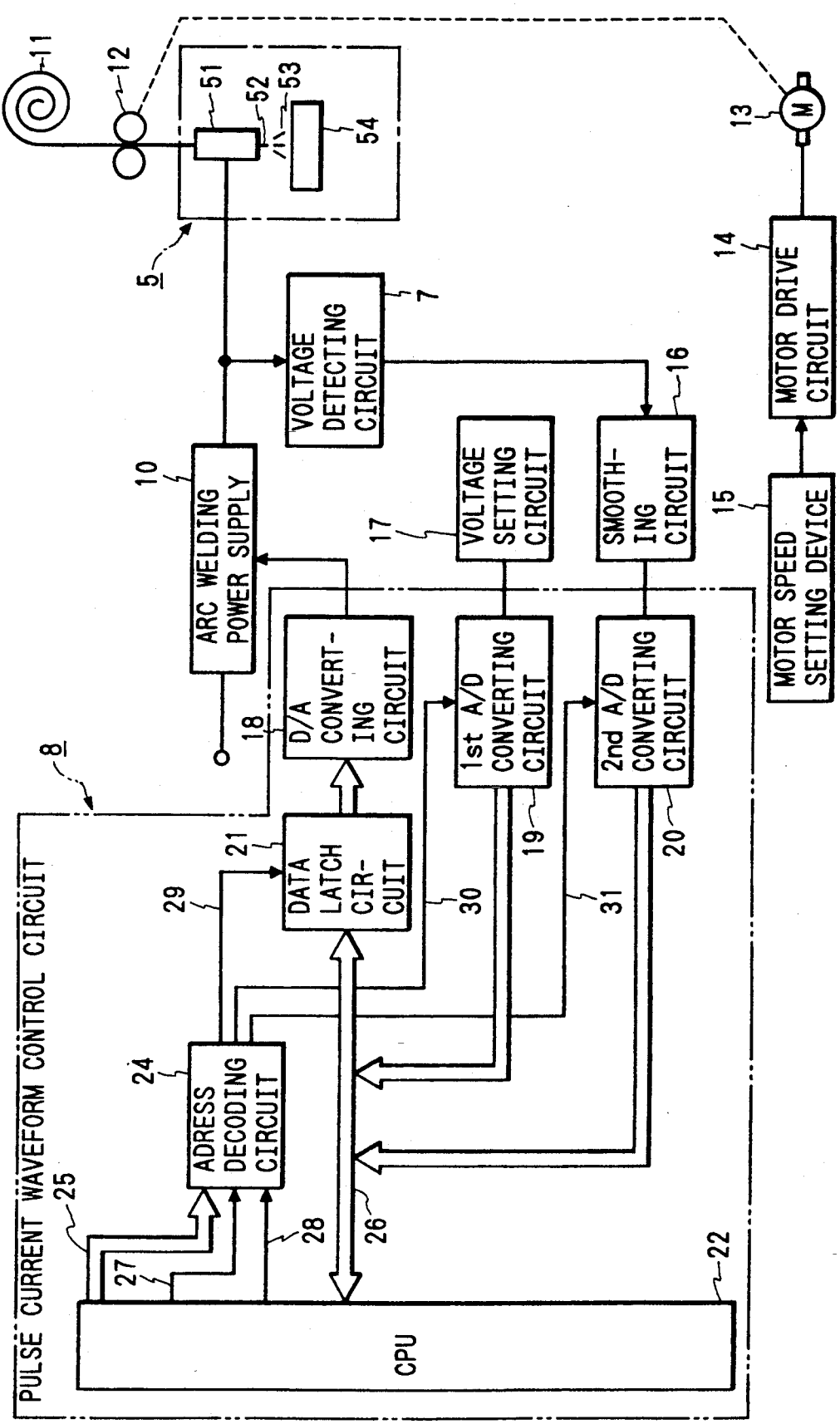

FIG. 5 is a block diagram showing still another embodiment of the invention. In the figure, the CPU 22 is constructed of a single-chip CPU having a ROM therein into which the program shown in FIG. 3 is stored. This embodiment is also adapted to operate in a manner similar to the embodiment in FIG. 1.

Figure 6:
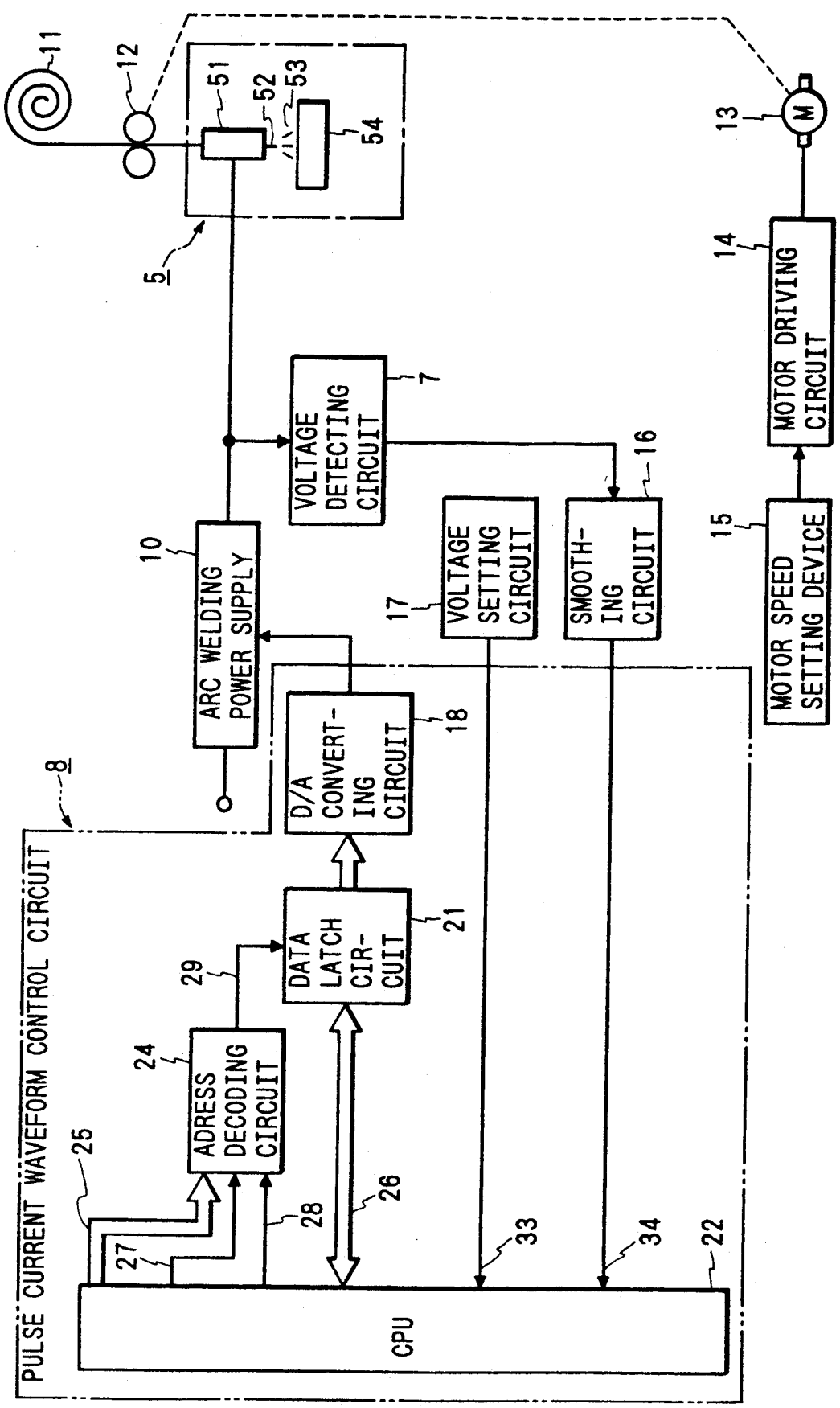

FIG. 6 is a block diagram showing yet another embodiment of the first inventive aspect. In the figure, the CPU 22 is constructed of a single-chip CPU having at least more than one A/D converting circuit and a ROM therein. The apparatus shown in FIG. 6 is also adapted to operate in a manner similar to that shown in FIG. 1.

According to the first inventive aspect, since the discharge current waveform is formed as the pulse current group, the division of the pulse current waveform causes the upward electromagnetic force on the wire electrode resulting from the pulse arc discharge to be intermittent, thereby reducing the force tending to lift the globule on the electrode. Therefore, the globules are easily separated from the electrode before they grow big without regard to the kind of shielding gas. The growing of the globule formed on the wire electrode alternates the separation of the globule like clockwork. A microcomputer is used as a circuit which controls the welding load unit so that the regular variation of arc length is ensured and a circuit which outputs the pulse group currents alternately with the base current or the short-circuit current. Thus, the circuits are implemented by control operations under a program and are advantageous in that:

(1) No adjustment of circuit elements is required so that the number of parts and adjusting time can be saved for low apparatus cost.

(2) A desired output current waveform can be provided at will by modifying the program, i.e., the replacement of a ROM, without changing the circuits, and the control operation can be changed at will without changing the circuits.

Figure 7:
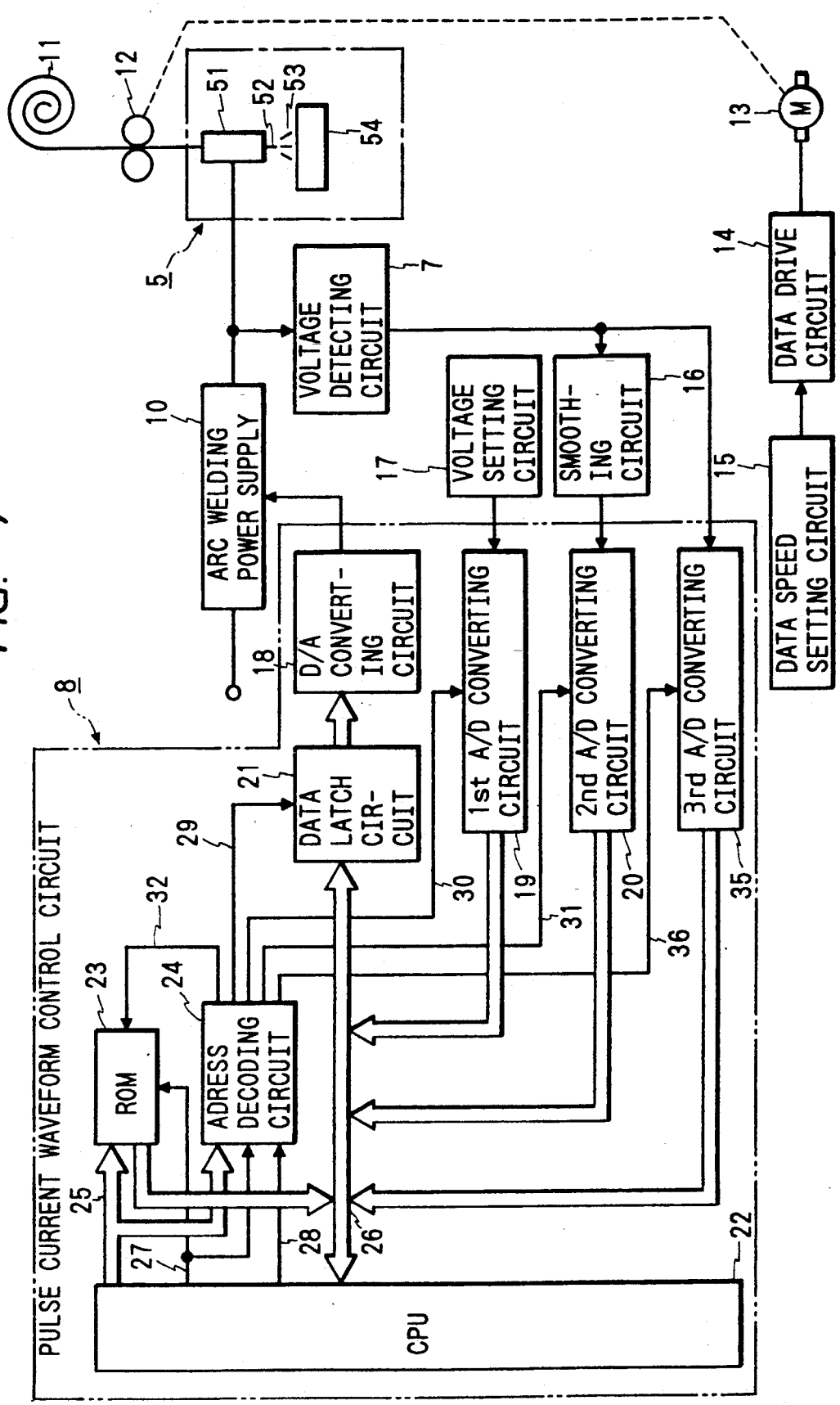
FIG. 7 is a block diagram showing an embodiment of a pulse welding apparatus according to a second inventive aspect.

FIG. 7 represents an embodiment of a second inventive aspect. The same elements as those in FIG. 1 have been given the same reference numerals and the detailed description thereof is omitted. In FIG. 7, the reference numeral 35 is a third A/D converting circuit which receives the output signal of the voltage detector 7, and reference numeral 36 is a third A/D converting circuit selection signal outputted from the address decoder 24. The construction in FIG. 7 includes a third A/D conversion circuit 35 which has a plurality of output signal lines connected to the data bus 26 and which receives the output signal of the voltage detecting circuit 7. The construction in FIG. 7 operates according to the algorithm in FIG. 3 at predetermined time intervals while the arc welding power supply unit 10 outputs the base current or short-circuit current. The construction in FIG. 7 also has the algorithm in which the digital data $V_{FBM}$ indicative of an instantaneous output voltage of the arc welding power supply current is compared with the digital data Vmax, where Vmax>Vset and Vset is the desired digital data, and the base current or short-circuit current is maintained if $V_{FBM}<$Vmax, and a second base current or short circuit current greater than the base current or short current only when $V_{FBM} \geq$Vmax.

Figure 8A:
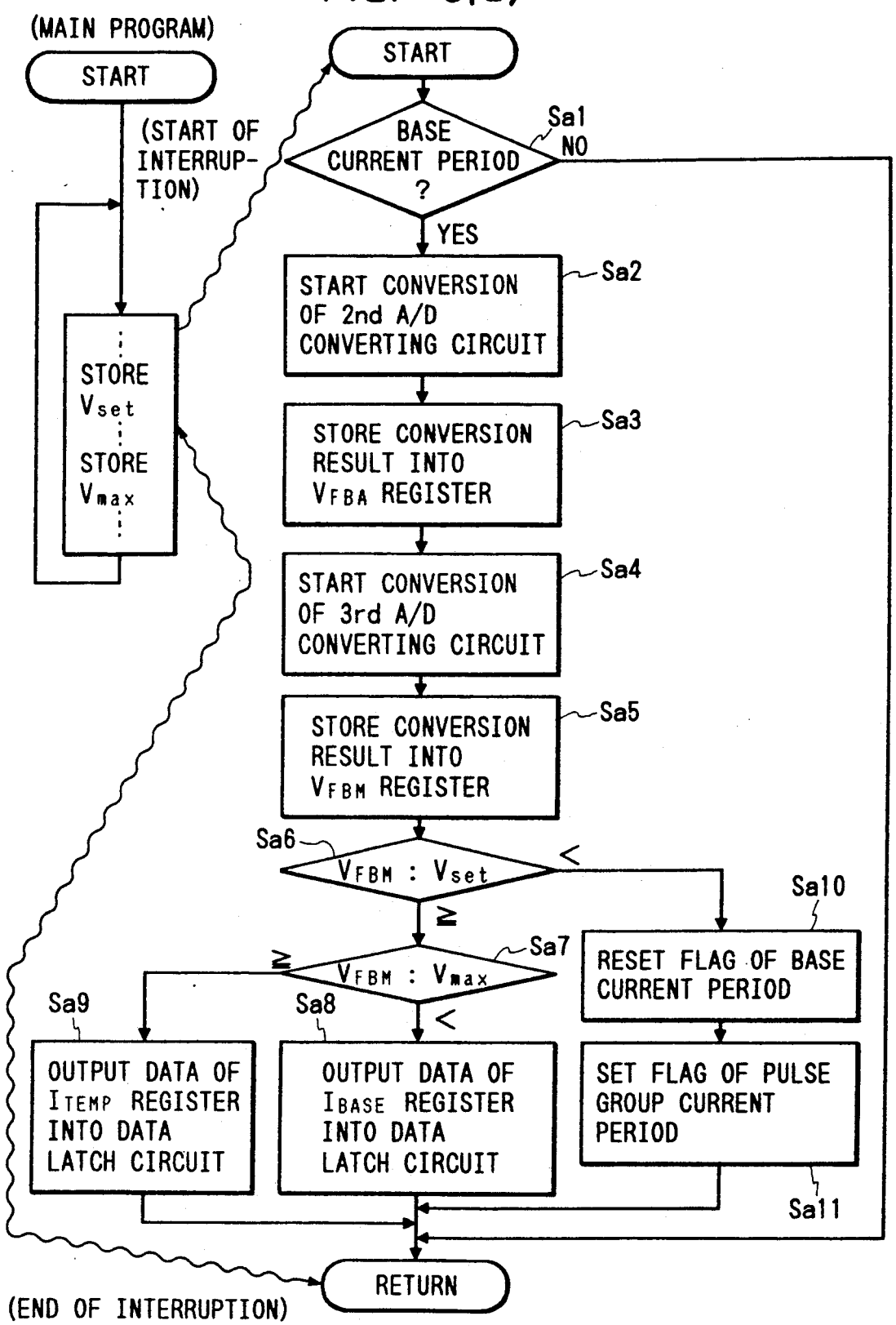
FIGS. 8(a) and 8(b) are flowcharts of a program under which a CPU performs the control operation of the apparatus in FIG. 7.
Figure 8B:
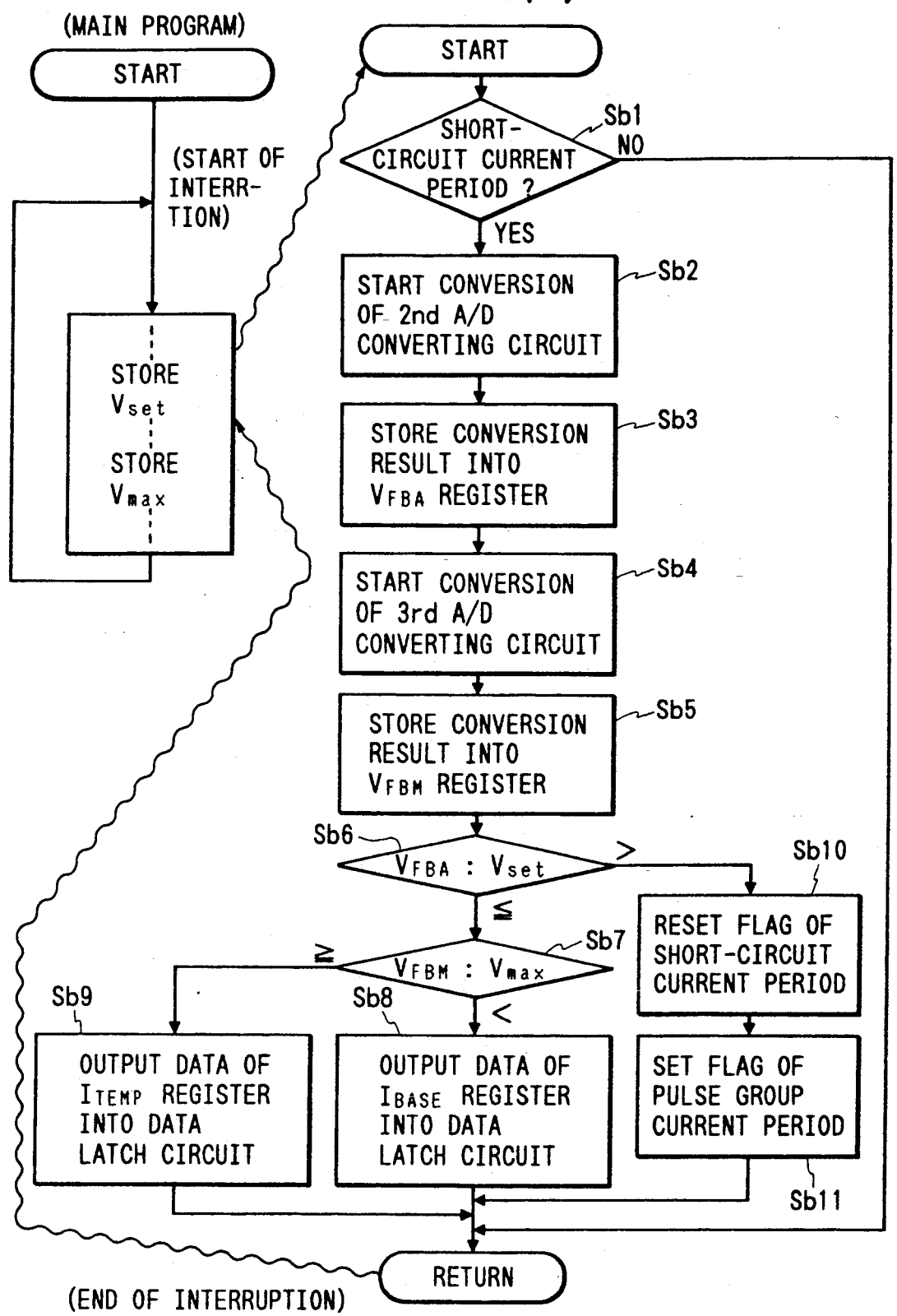

The operation of the CPU 22 will now be described with reference to FIGS. 8(a) and 8(b) similar to FIGS. 3(a) and 3(b). In FIG. 7, while the arc welding power supply unit 10 supplies the base current (Sa1, Sb1), the voltage signal indicative of the instantaneous output voltage of the arc welding power supply unit 10 is outputted from the voltage detector 7, and the voltage signal is converted by the third A/D converting circuit 35 into a digital data under the control of the program shown in FIG. 8 (Sa2–Sa5, Sb2–Sb5). As shown in FIG. 8, the digital data $V_{FBM}$ is compared with the data Vmax prestored in the main program (Sa6–Sa7, Sb6–Sb7) so as to output a data indicative of the base current or short-circuit current to the data latch circuit 21 when $V_{FBM}<$ Vmax (Sa8, Sb8), and to output a second base current or short-circuit current greater than the base current to the data latch circuit 21 when $V_{FBM} \geq$ Vmax (Sa9, Sb9). Additionally, when $V_{FBM}<$ Vset, the program proceeds to supplying the pulse current group (Sa10, Sa11, Sb10, Sb11). In FIG. 7, the third A/D converting circuit selection signal 36 is obtained through the address decoder circuit 24 which decodes the address data outputted from the address bus 25 and the read signal 27 of the CPU, and functions as a start signal of a sampling signal of the sample-and-hold circuit included in the third A/D converting circuit 35.

With the construction in FIG. 7 and under the program in FIG. 8, when the output voltage exceeds the setting value Vmax while the base current (or short-circuit current) is supplied, the apparatus supplies the second base current or short-circuit current so as to act as a circuit in which the magnetic blow or so-called Arc-blow is prevented while the base current or short-circuit current is flowing in pulse arc welding.

In other words, according to the embodiment of the second inventive aspect, a magnetic-blow preventing circuit can easily be implemented while also exhibiting the effects derived from the first inventive aspect.

In FIG. 7, the CPU 22 may be of a single-chip type which incorporates the first to third A/D converting circuits 19, 20, and 35, and the ROM 23. While the embodiments of the aforementioned respective inventive aspects have been described with respect to the group current (pulse group) having one or more than one pulselike peak current and base current, any other current waveforms may be used if they are of the waveform which causes the workpieces as an electrode to melt.

The voltage detecting circuit, which detects the voltage of the welding load circuit in accordance with the conditions of welding load such as the output voltages of the arc welding supply unit and arc lengths, may be of a voltage detecting circuit that detects the signal voltage indicative of the welding conditions such as arc length instead of the output voltage of the arc welding power supply unit.

A specific example will be described of a pulse welding apparatus in which a current waveform control circuit is provided in the form a microcomputerized digital circuit so as to prevent poor welding results due to magnetic blow, undercuts, or spatters attended with the external disturbances to the welding torch under various welding conditions and environment.

Figure 9:
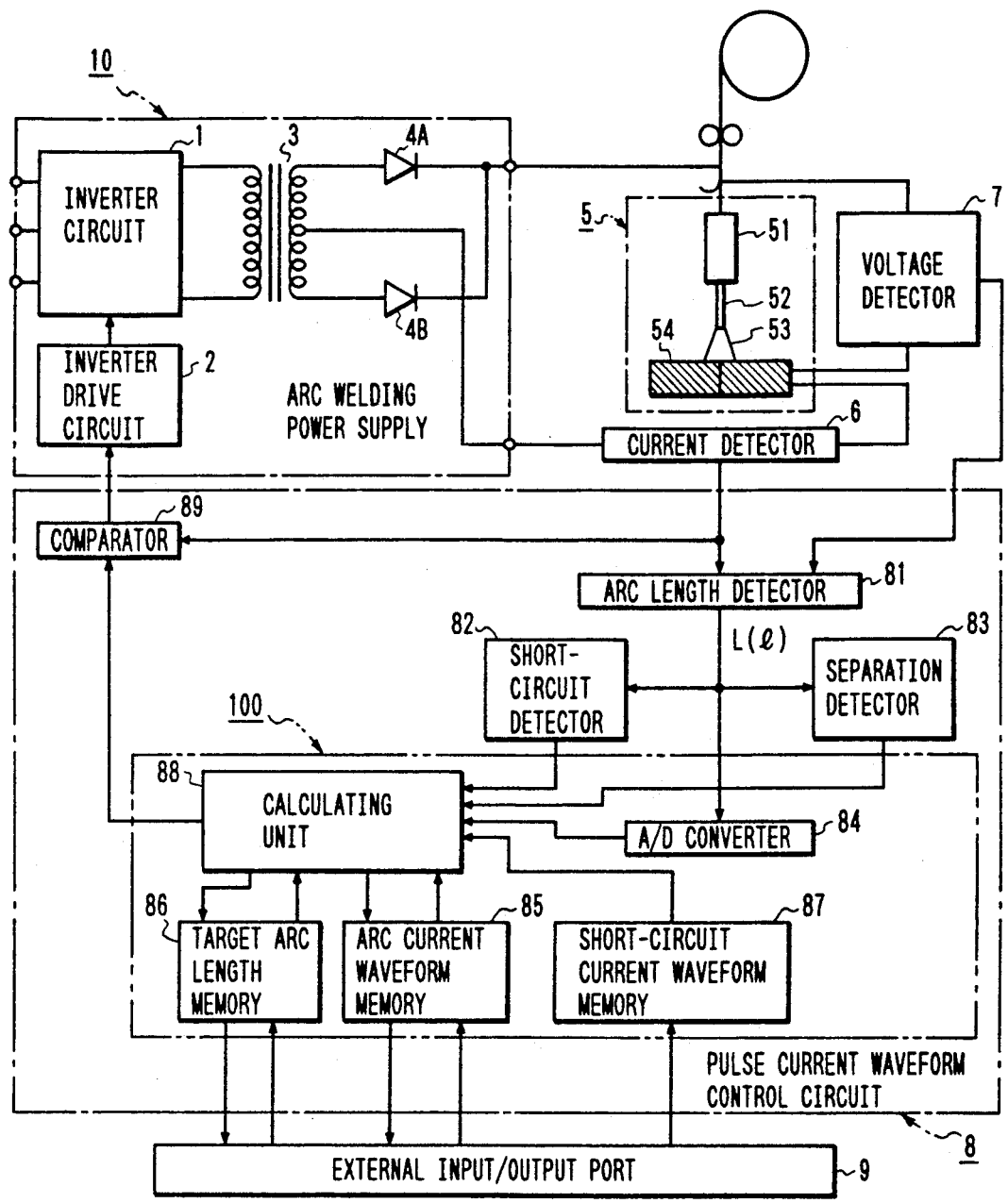
FIG. 9 shows an overall construction of the pulse welding apparatus explaining a third to tenth inventive aspects.

FIG. 9 shows an overall construction of a pulse welding apparatus for explaining the respective embodiments of the third to tenth inventive aspects. In the figure, reference numeral 1 is an inverter circuit which is controllably driven by the inverter drive circuit 2, reference numeral 3 is a high frequency transformer, reference numerals 4A and 4B are high frequency diodes, all forming the arc welding power supply 10. Reference numeral 5 is an arc load unit which is constructed of a welding torch 51, wire electrode 52 supplied through the torch 51 accommodated in a wire reel, arc discharge 53, and workpieces 54. A desired pulse group current waveform i, inverter-controlled, is supplied from the aforementioned inverter circuit 1 to the welding torch 51 via the transformer 3 and the high frequency diodes 4A and 4B so as to perform arc welding.

Reference numeral 6 is a current detector for detecting the aforementioned pulse group current, and reference numeral 7 is a voltage detector for detecting the voltage across the electrodes; reference numeral 8 is a pulse current waveform control circuit which drives the aforementioned inverter circuit i to control the waveform of the output pulse current on the basis of the current detected by the current detector 6 that detects the aforementioned pulse current i and the voltage detected by the aforementioned voltage detecting circuit 7. The pulse current waveform control circuit 8 is provided with an arc length detector 81 for detecting the signal L(l) indicative of arc length between the tip of wire electrode and the workpieces on the basis of the values I and V detected by the aforementioned current detector 6 and the voltage detector 7, a short-circuit detector 82 for outputting a short-circuit detection signal when the detected signal L(l) of the arc length detector 81 does not reach a predetermined level, a separation detector 83 for detecting the separation, and a microcomputerized digital circuit 100. Furthermore, the microcomputerized digital circuit 100 includes an A/D converter 84 for converting the analog signal detected by the arc length detector 81 into digital, an arc current waveform memory 85 in which the pulse peak current value Ip(n), base current value $I_B$(n), pulse width $\tau$(n), and pulse intervals $C_A$(n) of the respective pulses, all for constituting the pulse current group which is supplied via the external input/output port (9), are stored, a target arc length memory 86 where the target arc length Lo(n) is stored, a short-circuit current waveform memory 87 where the short-circuit current Is(n) supplied when short-circuiting, and a calculating unit 88 in the form of a CPU which produces and supplies a comparator 89 with a pulse current lo whose waveform has been shaped so that the adverse effects from external disturbances during welding operation and welding area on the basis of the values stored in the respective memories and the detector outputs of the respective detectors. The aforementioned comparator 89 compares the pulse current Io with the detected value of current i so as to output a control signal in accordance with the comparison result to the inverter control circuit 2.

The aforementioned arc length detector 81 comprises buffer amplifiers 81a and 81b, a multiplier 81c which reads the detected current i via the buffer amplifier 81a and produces a positive characteristic constant K1(i)i of the arc voltage as a result of multiplying K1(i) by the current i, an offset voltage constant setting unit 81d for setting the offset voltage constant K2, an adder 81e which adds the outputs of the aforementioned multiplier 81c and the DC voltage constant setting unit 81d, and a comparator 81f which produces a comparison output L(l)=V−Vx in accordance with the arc length by comparing the added output Vx=K1(i)i+K2 of the adder 81e with the detected voltage V from the voltage detector 7. The arc length detector 81 detects the arc voltage in accordance with the arc length on the basis of the detected voltage and detected current.

The arc voltage V may be expressed by V=R(i)i+Al+B where R(i) is the positive characteristic constant of arc, i is an arc current, A is a proportional constant for an arc length, l is the arc length, and B is a minimum voltage. From a point of view of circuit design, the voltage is expressed by $Vx=K1(i)i+K2$ where $K1(i)$ is the positive characteristic constant and $K2$ is the offset voltage constant. Therefore, the difference $(Ll)=V-Vx$ turns out to be $L(l)=V-Vx=\{R(i)-K1(i)\}i+Al+B-K2$. If $R(i)$ and $K1(i)$ are selected so that $R(i)$ is nearly equal to $K1(i)$, then $(Ll)$ is nearly equal to $Al+(B-K2)$, being reduced to a function of only the arc length. Thus, selecting proper values of A, B, and K2, the difference $L(l)=V-Vx$ outputed from the comparator $85f$ becomes the arc length signal indicative of an actual arc length.

Figures 10, 11A, 11B:
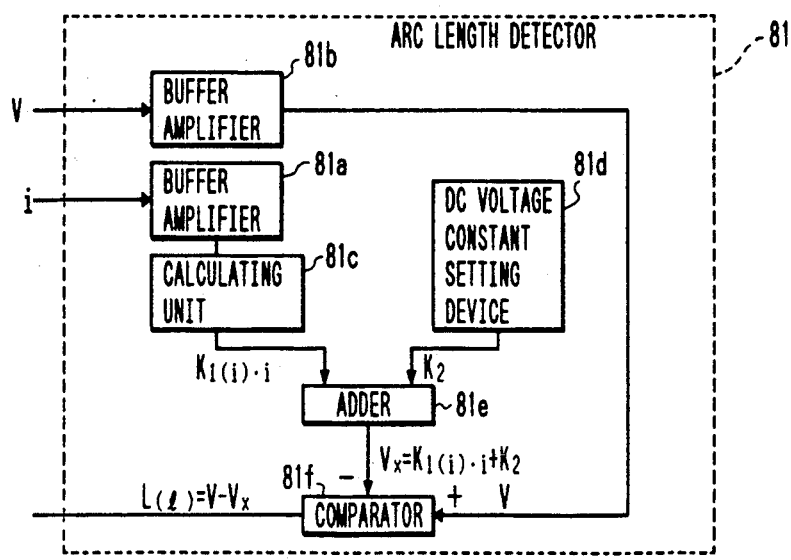
FIG. 10 shows the construction of an arc length detector (81) in FIG. 9.
FIGS. 11(a) and 11(b) are illustrative diagrams illustrating the construction of the arc current waveform memory (85) and the target arc length memory (86)
Figure 12:
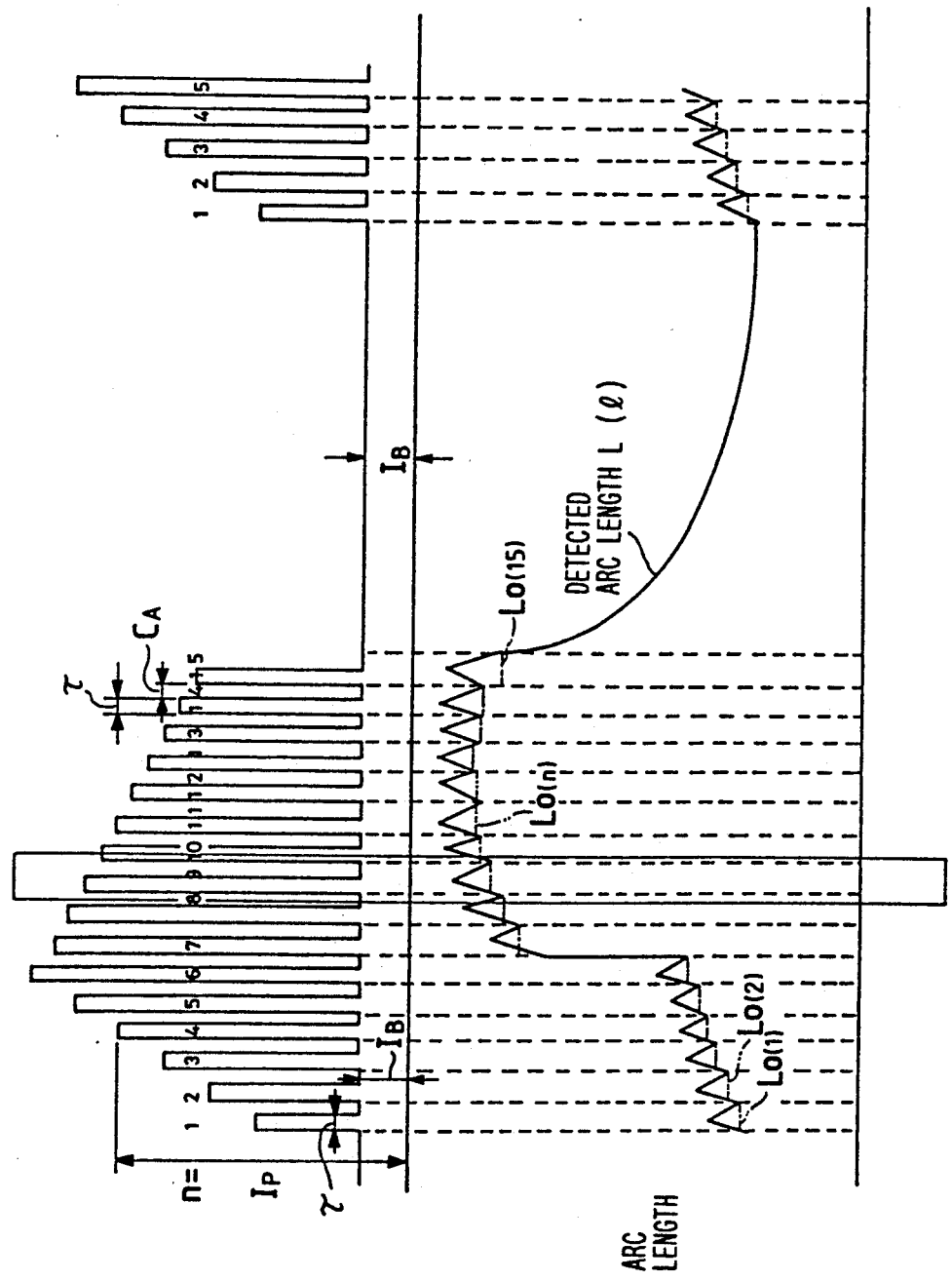
FIG. 12 is an illustrative diagram of the pulse current waveform.

The arc current waveform memory 85 has, as shown in FIGS. 11(a) and 11(b), a first memory area (FIG. 11(a)) for storing the respective pulse peak values Ip(n), base currents $I_B(n)$, pulse widths $\tau(n)$ and pulse intervals $C_A$ for $n=1$ to $n_o$ of pulse group as shown in FIG. 12 supplied from the external input/output port 9, and a second memory area (FIG. 11(b)) where the respective pulse peak values Ip(m,n), base current values $I_B(m,n)$, pulse widths $\tau(m,n)$, and pulse intervals $C_A(m,n)$ of the pulse current group produced on the basis of later described "learning" welding for each of respective regions $m=1$ to $m_o$ obtained by dividing the workpieces from the center thereof by specific angles when welding the peripheral portion of the workpieces 54 at a specific speed.

A specific embodiment of a third inventive aspect will now be described. The third inventive aspect is a pulse welding apparatus having a construction shown in FIG. 9 with the short-circuit detector 82, separation detector 83, and short-circuit current waveform memory 87 eliminated. The calculating unit 88 has the algorithm formed of a storage means where in the first welding stage, the arc current waveform parameters stored in the first memory area (FIG. 11(a)) in the arc current waveform memory 85 defined through the external input/output port 9 are corrected for the respective welding regions in accordance with the difference between the detected arc length signal and the target arc length signal, and is then stored into the secondary memory area (FIG. 11(b)) of the aforementioned arc current waveform memory 85, and a control means by which the aforementioned arc current waveform parameters stored are read out after the second welding stage for the respective welding and are increased or decreased in accordance with the difference between the detected arc length signal and the target arc length signal.

Figure 13A:
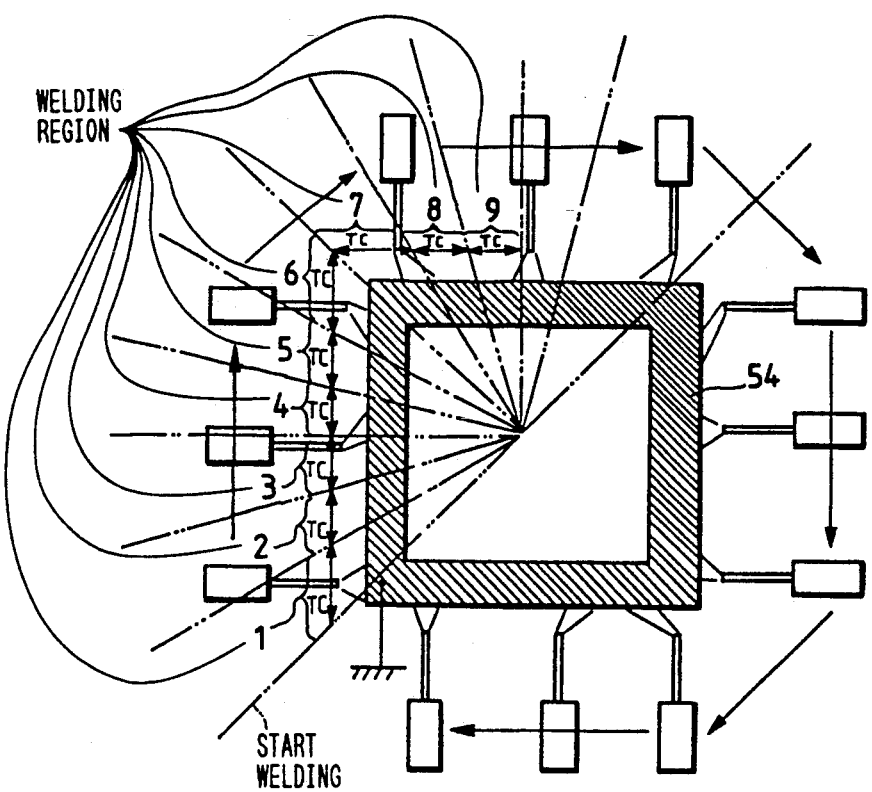
FIGS. 13(a) and (b) illustrates the first welding stage and the second welding stage according to the third inventive aspect.

The operation of the third inventive aspect will be described referring to the flowcharts for the calculating unit 88 shown in FIGS. 14 and 15 with respect to a case where the workpieces 54 in FIG. 13(a) are welded at its periphery.

Figure 14B:
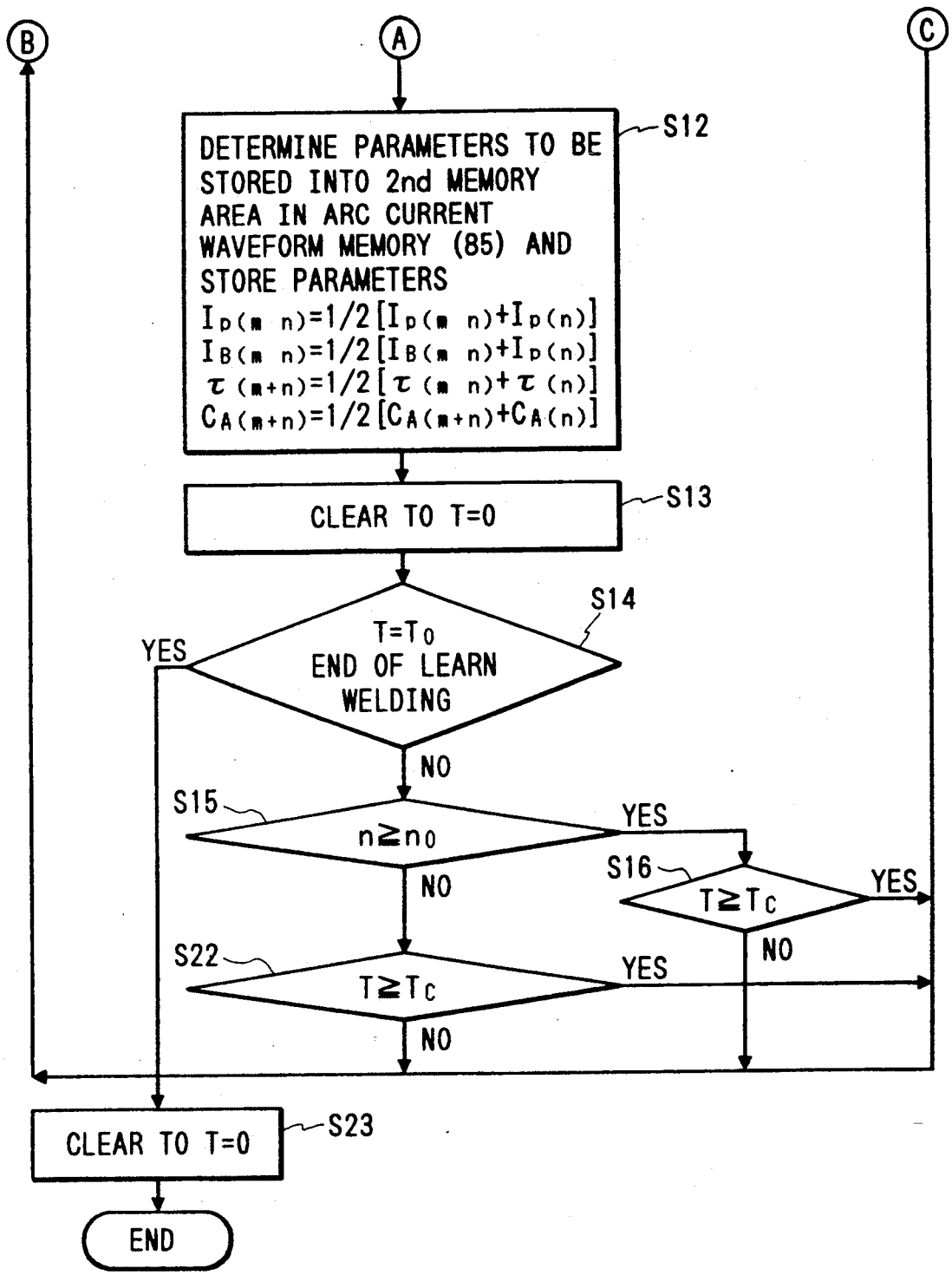

FIG. 14 shows a flowchart of the first welding stage of the present invention as a "learning welding". Welding is performed in accordance with the pulse current waveform parameters stored in the first memory area shown in FIG. 11(a) of the arc current waveform memory 85 defined through the external input/output pot 9. During which the aforementioned arc current waveform parameters for the respective welding apparatus are corrected in accordance with the difference between the detected arc length signal and target arc length signal. The arc current waveform parameters controllably adjusted its waveform for the welding region are stored into the second memory area of the aforementioned arc current waveform memory 85 in FIG. 11(b) FIG. 15 shows a flowchart of the second welding stage of the present invention in which the arc current waveform parameters stored in the second memory area in the aforementioned first welding stage are read out for the respective welding regions and are then increased or decreased in accordance with the difference between the detected arc length signal and the target arc length signal.

In the first welding as a learning welding in FIG. 14, the respective parameters Ip(n), $I_B(n)$, $\tau(n)$, $C_A(n)$ and target arc length lo(n) of the pulse current group are inputted through the external input/output port 9 into the first memory areas of the arc current waveform memory 85 and the target arc length memory 85.

With this condition, as shown in FIG. 13(a), the calculating unit 88 reads (step S5) the arc current waveform parameters Ip(n), $I_B(n)$, $\tau(1)$, $C_A(1)$, and Lo(1) from the arc current waveform memory 85 and the target arc length memory 86 for $m=1$ and $n=1$ (steps S1-S4) where m is the iterative loop for a welding region information and n is the iterative loop of the respective pulse current group outputted to the respective welding region. Then the welding current in accordance with these parameters is outputted to the comparator 89 (steps S6 and S7).

In this manner, the pulse current lo is outputted from the calculating unit 88 to the comparator 89 which in turn outputs an ON signal to the inverter drive circuit 2 so that the inverter drive signal is transmitted from the inverter drive circuit 2 to the inverter circuit 1 to drive the inverter. Driving the inverter causes the shaped alternating waveform to be outputted to the high frequency transformer 3 whose output is rectified by the high frequency diodes 4A and 4B into a DC waveform so as to supply the arc load unit 5 with the pulse arc current waveform i. The pulse waveform i produces the pulse arc discharge 53 across the wire electrode 52 and the workpieces 54 so that the workpieces and the tip end of wire electrode 52 are melted by the pulse discharge 53.

At this time, the arc length detector 81 detects the arc length L(l) on the basis of the detection signal I and V from the current detector 6 and the voltage detector 7, respectively, and outputs the arc length L(l) to the calculating unit 88. The calculating unit 88 reads out both the aforementioned detected arc length L(l) and the target arc length Lo(l) in the target arc length memory 86 (steps S9) when the arc current supply is completed for $n=1$ i.e., when $T=\tau(1)+C_A(1)$ (step S8). Then, the difference $\Delta L=L(l)-Lo(1)$ is calculated (step S10) and the arc current waveform parameters are corrected by the following equations (step S11).

$$Ip(m,n)=Ip(n)-B_1\Delta L$$

$$I_B(m,n)=I_B(n)-B_2\Delta L$$

$$\tau(m,n)=\tau(n)-B_3\Delta L$$

$$C_A(m,n)=C_A(n)-B_4\Delta L$$

B1-B4 are proportional constants.

Parameters to be stored into the second memory area are obtained by the following equations on the basis of the above-corrected arc current parameters and the arc current parameters stored in the first memory area of the arc current waveform memory 85 (step S12).

$$Ip(m,n)=\tfrac{1}{2}[Ip(m,n)+Ip(n)]$$

$$I_B(m,n) = \tfrac{1}{2}[I_B(m,n) + I_B(n)]$$

$$\tau(m,n) = \tfrac{1}{2}[\tau(m,n) + \tau(n)]$$

$$C_A(m,n) = \tfrac{1}{2}[C_A(m,n) + C_A(n)]$$

Then, after going through steps S14–S16, the time t is cleared to t=0 and then the program returns to step S4 where the iterative loop n is updated to n=2. If n≧2, then the arc current waveform parameters and the target arc length detection signal are read in at step S5 so as to correct the arc current waveform parameters by the similar equations to step S12 on the basis of the difference ΔL between the arc length detection signal L(l) and the target arc length Lo(n) (step S17 and S18). The arc length detection signal L(l) when the difference signal ΔL is determined is the value when sampling was last made last for n−1. Pulses are outputted on the basis of the above-corrected arc current waveform parameters (step S19 and S20).

Then, the arc length detection signal L(l) based on the pulse output are read (step S21) and the program returns to step S12 where the parameters to be stored into the second memory area are obtained on the basis the above-corrected arc current waveform parameters and the arc current waveform parameters stored in the first memory area of the arc current waveform memory 85.

This process is carried out consecutively for the respective pulse current groups till n=n₀ and for the total output time till T=Tc (step S15, S22).

Figure 13B:
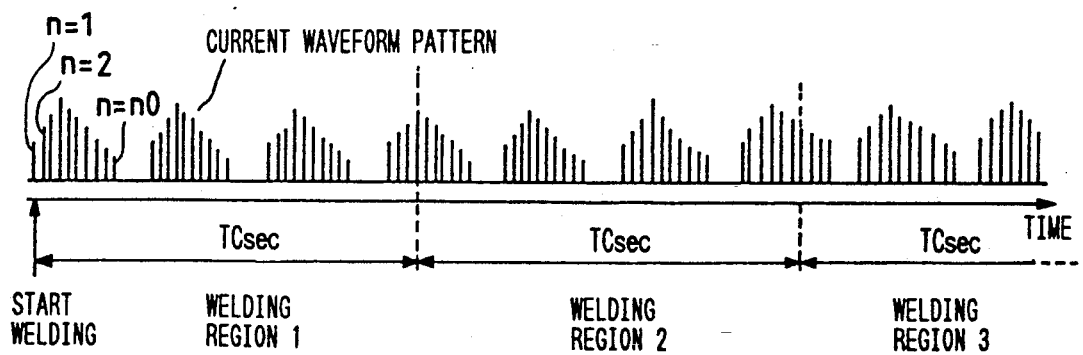

In steps S16 or S22, the program proceeds to the next welding region when T=Tc. Thus, the program returns to step 2 where the iterative loop of welding region is updated. The above-mentioned operation is repeated to correct the parameters for the respective welding regions along the shape of the workpieces 54 shown in FIG. 13(a), and the corrected parameters are stored into the second memory area shown in FIG. 11(b). In step S14, when T=To, the time is cleared to T=0 (step S23) to complete learning welding. FIG. 13(b) shows the output waveforms of the respective pulse groups at this time.

Therefore, as mentioned above, the respective parameters stored in the second memory area of the arc current waveform memory 85 in the first welding stage, are used to eliminate the effects of variation of the arc length due to magnetic blow so that the faulty separation of globules due to magnetic blow is controlled. The parameters are then stored as waveform parameters which are learned taking into account the magnetic blow in the respective welding regions.

Figures 15, 15A:
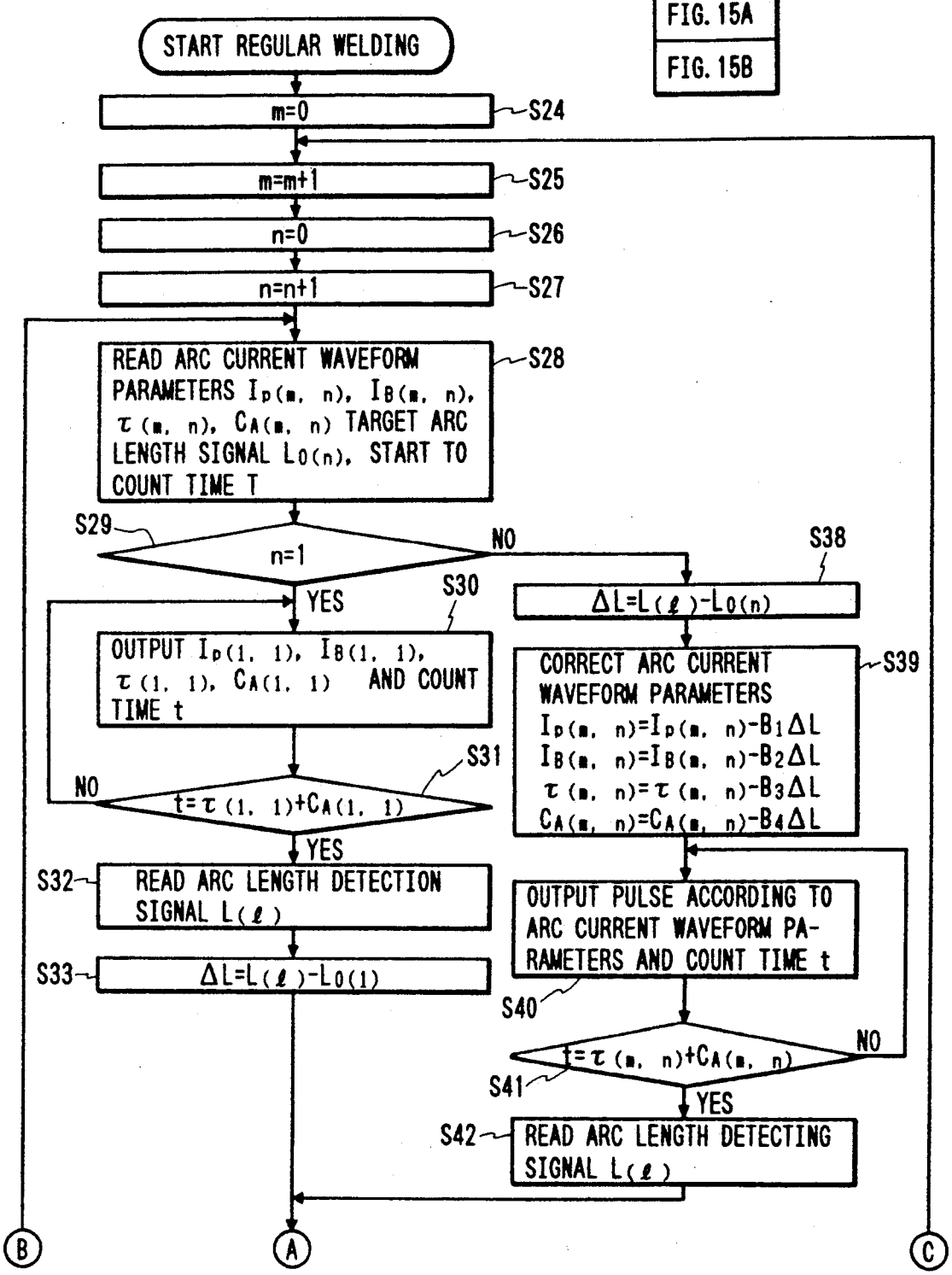
Figure 15B:
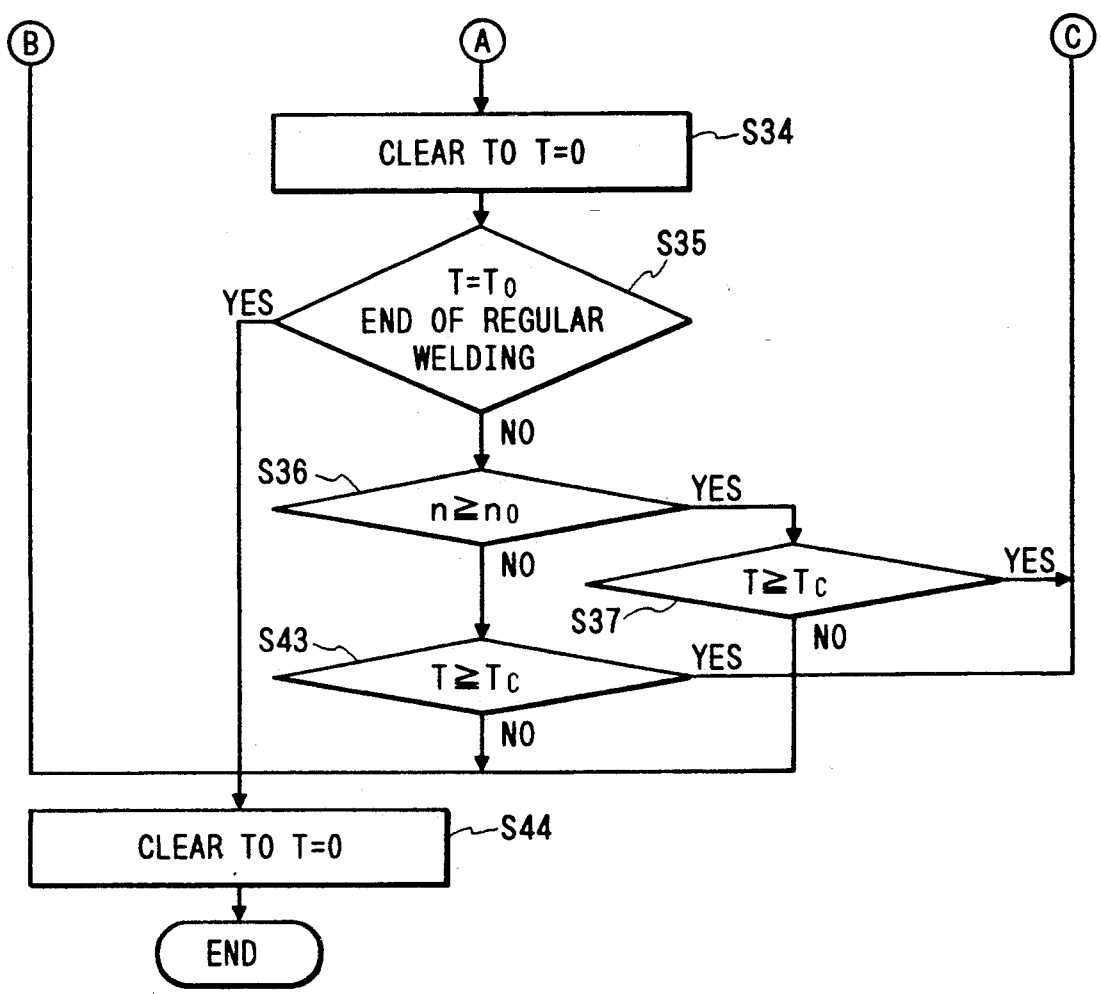
Figure 17:
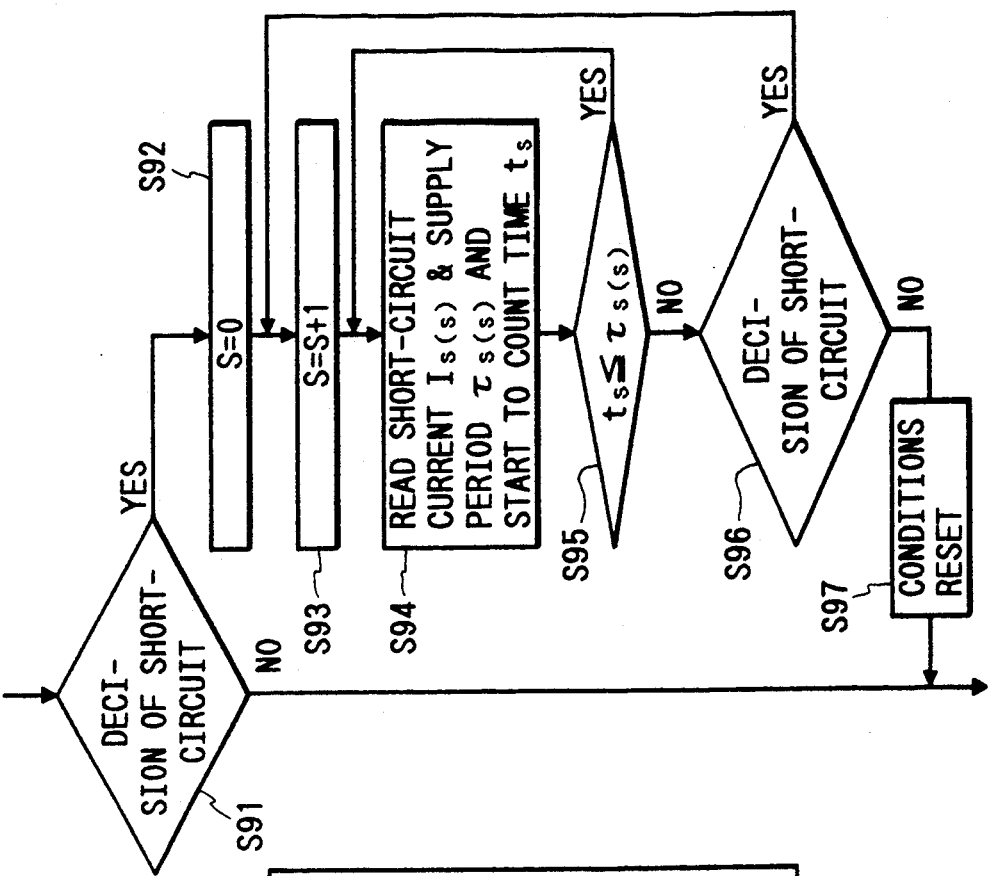
FIG. 17 is a flowchart of the calculating unit (88) according to a fifth inventive aspect.
Figure 16:
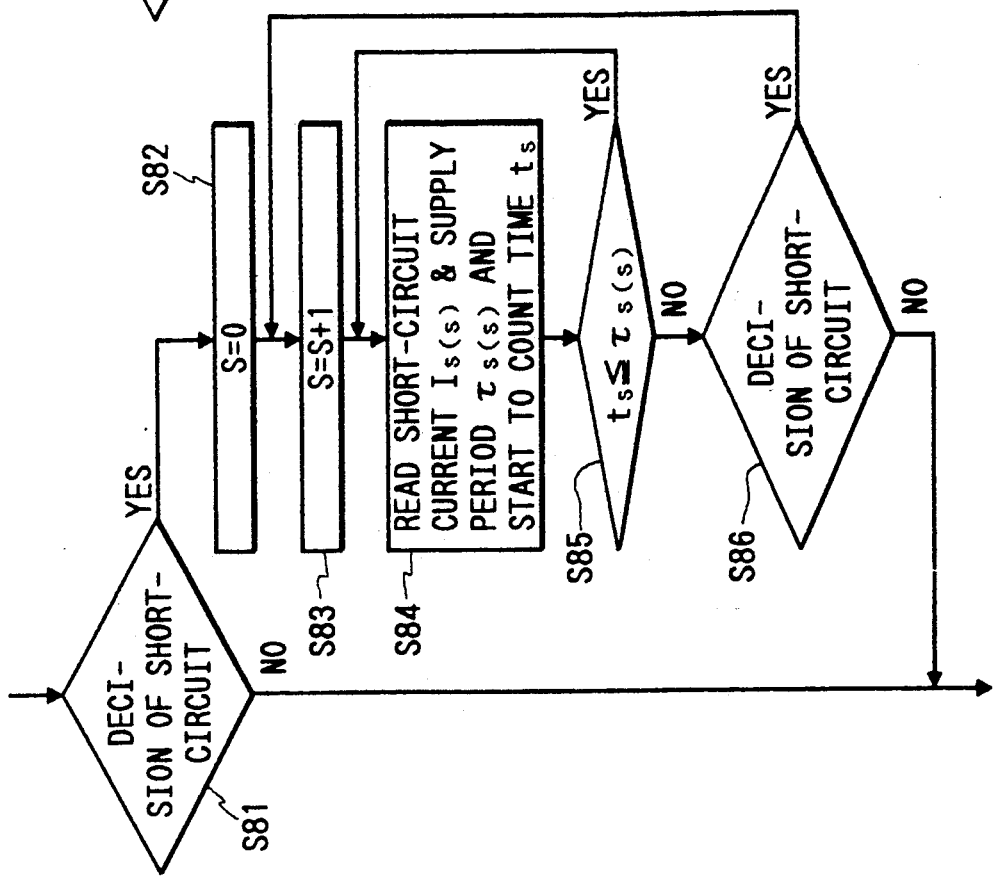
FIG. 16 is a flowchart of the calculating unit (88) according to a fourth inventive aspect.

Furthermore the learning welding as the first welding stage is followed by the regular welding as the second welding stage shown in FIG. 15. The regular welding shown in FIG. 15 is basically the same as the flow of learned welding in FIG. 14 except that at step S28 similar to step S5 in FIG. 14, the arc current waveform parameters Ip(m,n), Ip(m,n), τ(m,n), C_A(m,n) in the second memory area of the arc current waveform memory 85, which are learned in the learning welding and are shown in FIG. 11(b), are read in; steps S11 and S12 are omitted; at step S39 similar to step S18, the arc current waveform parameters stored in the second memory area is corrected on the basis of the difference ΔL between the previous arc length detection signal L(l) of the iterative loop and the target arc length signal Lo(n) the pulses are outputted based on the thus corrected parameters.

Thus, in the regular welding as the second welding, the arc length is feed-back controlled with reference to the welding current waveform parameters learned in the first welding stage, so that the faulty separation of globules due to the magnetic blow is controlled as well as the arc length variation occurring at the welding torch due to external disturbances is controlled, improving the quality of welding under various welding environments.

Hence, in addition to the effects derived from the embodiments of the first and second inventive aspects, the third inventive aspect has the advantages that the variation of arc length due to the magnetic blow is eliminated in the first welding stage so as to reduce the faulty separation of globules resulted from magnetic blow, the learned waveform parameters are obtained taking the magnetic blow into account in the respective welding regions, and the feedback control of arc length feedback with reference to the welding current waveform parameters learned in the first welding stage reduces not only the faulty separation of globules due to magnetic blow but also the variation of arc length due to external disturbances occurring at the welding torch. Therefore, the welding quality is ensured under various welding environments.

A specific example of the fourth inventive aspect will now be described. The fourth inventive aspect is a pulse welding apparatus of the overall construction in FIG. 9 with the separation detector 83 eliminated. The calculating unit 88 has the algorithm in which when the short-circuit is detected by the short-circuit detector 82 in the second welding stage, the short-circuit current is read out from the short-circuit current waveform memory 87 where both the step-wise short-circuit current Is(S) supplied when short-circuiting and the supplying period τs(S), are stored.

That is, the short-circuit current waveform memory 87 holds both the supply period τs(S) (S=1, 2, ..., So) and the stair-case-like short-circuit current Is(S) whose magnitude is controlled via the external input/output port 9 to increase in steps. The calculating unit 88 performs short-circuit interruption processing where when the short-circuit detection signal is supplied from the short-circuit detector 82 during the second welding stage (step S81), the short-circuit current Is(S) and the supply period τs(S) are read out from the aforementioned short-circuit current waveform memory 87 and the short-circuit current whose magnitude increases in step wise is continuously supplied by updating the iterative loop till the short-circuit is removed. After the short-circuit is removed, the program returns to the control of the regular welding just before the short-circuit occurred in FIG. 15 (steps S82–S86).

According to the fourth inventive aspect, the current waveform- is predivided into the short-circuit current waveform and the arc current waveform so that even when short-circuit occurs suddenly due to external disturbances during the regular welding, the current waveform is automatically switched to the short-circuit current waveform. The fourth inventive aspect ensures the improvement of quality of welding in addition to the effects of the third inventive aspect.

A specific example of the fifth inventive aspect will now be described. The fifth inventive aspect is a pulse welding apparatus of the overall construction in FIG. 9 with the separation detector 83 eliminated as in the fourth inventive aspect. The calculating unit 88 has the algorithm in which when the short-circuit is detected by the short-circuit detector 82 in the second welding stage, on the basis of the waveform parameters of welding current learned in the first welding stage, the short-circuit current is read out from the short-circuit current waveform memory 87 where both the step-wise short-circuit current Is(S) supplied when short-circuiting and the supplying period $\tau s(S)$, are stored, and then after the short-circuit is removed, the arc current waveform is reset and the arc current waveform is supplied.

That is, the short-circuit current waveform memory 87 holds the stair-case-like short-circuit current Is(S) whose magnitude is controlled via the external input-/output port 9 to increase the supply period $\tau s(S)(s=1, 2, \ldots, So)$ in steps. The calculating unit 88 performs short-circuit interruption processing where when the short-circuit detection signal is supplied from the short-circuit detector 82 during the second welding stage (step S91), the short-circuit current Is(S) and the supply period $\tau s(S)$ are read out from the aforementioned short-circuit current waveform memory 87 and the short-circuit current whose magnitude increases gradually step wise is continuously supplied by updating the iterative loop till the short-circuit is removed.

After the short-circuit is removed, the arc current waveform is reset and the arc current waveform is supplied for $n=0$ as shown in FIG. 15 (steps S92–S97).

According to the fifth inventive aspect, when the short-circuit occurs, the short-circuit current is immediately run, and after the short-circuit is removed the arc current waveform is reset before supplying the arc current waveform. Thus, in the short-circuit transfer arc welding method, the same effects as in the third inventive aspect are obtained.

A specific embodiment of a sixth inventive aspect will now be described. The sixth inventive aspect has the entire construction in FIG. 9. The calculating unit 88 has the algorithm where in the regular welding or the second welding stage, the charge amount of current after the globule separates from the electrode is detected in response to the detection signal from the separation detector 83, which detects the separation of globule grown on the tip of wire electrode, on the basis of the waveform parameters of welding current learned in the first welding in the third and fourth inventive aspects so as to run the minimum base current when the charge amount is more than a predetermined value.

Figure 18:
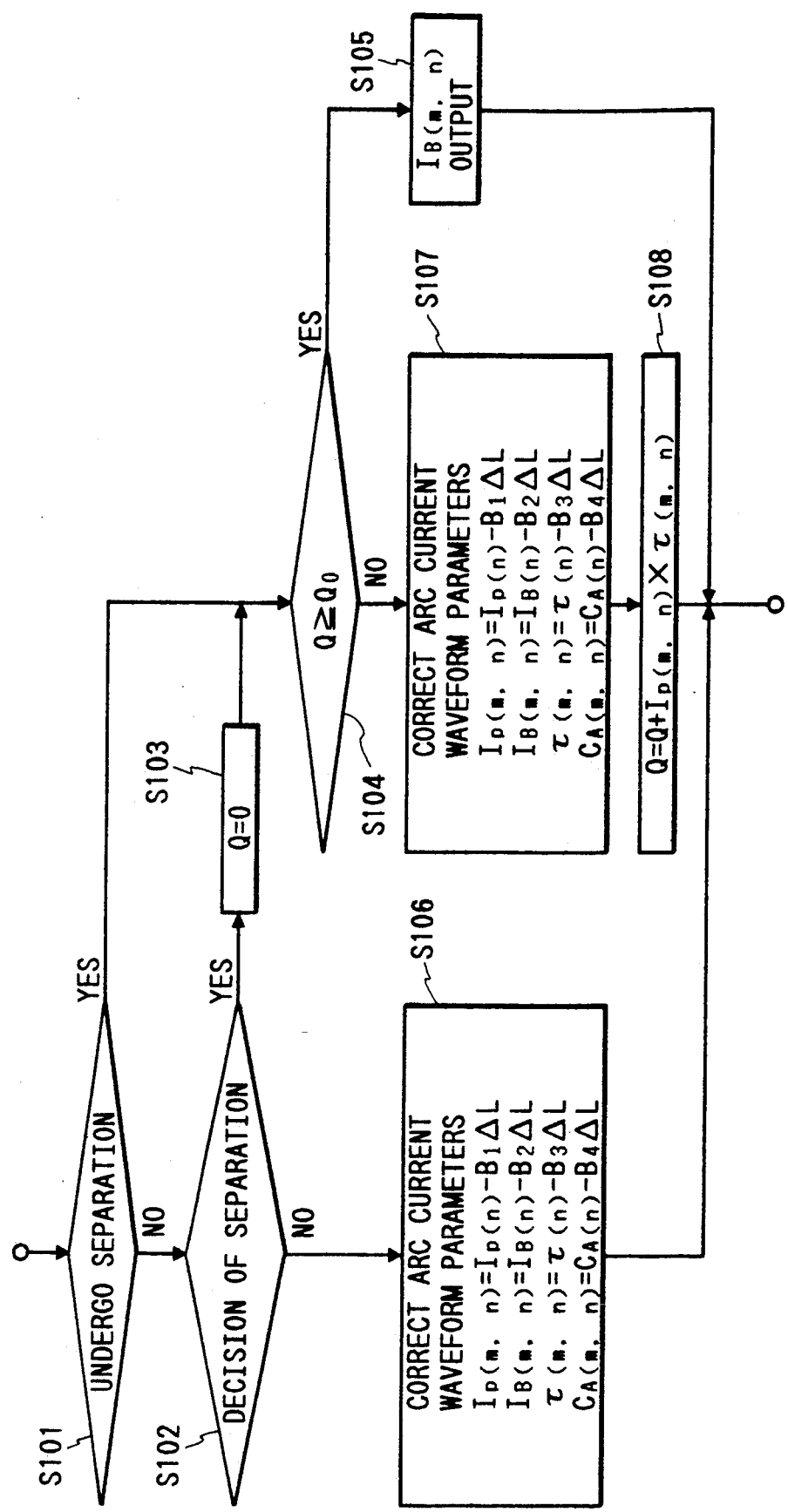
FIG. 18 is a flowchart of the calculating unit (88) according to a sixth inventive aspect.

That is, FIG. 18 shows a flowchart corresponding to steps S39–S41 in the regular welding in FIG. 15. When the separation detection signal is received from the separation detector 83 (step S101, S102), the charge amount Q is reset and then the charge amount after separation of globule is detected. If the charge amount exceeds a predetermined value Qo, then a minimum base current Is(m,n) is outputted (step S105). After separation, the program immediately jumps from step S101 to step 104. If the answer is "NO" at steps s102 and S104, the program proceeds to steps 106–107 where the respective parameters are corrected. After step S107, the charge amount Q is corrected by an equation $Q=Q+Ip(m,n)\tau(m,n)$ at step S108. The rest of the flowchart is the same as that in FIG. 15.

In the sixth inventive aspect, the total charge amount of current over a time length after detection of separation is detected and then the current is reduced when the thus detected charge amount reaches the predetermined value. Thus, the amount of globule when separating may be maintained nearly constant allowing welding operation to be in more regular manner.

In the regular welding, the sixth inventive aspect has the algorithm where the charge amount of current after separation is detected on the basis of the detection signal from the separation detector 83 that detects the separation of globule formed on the tip of the wire electrode, and the minimum base current is run when the charge amount exceeds the predetermined value.

That is, FIG. 18 shows a flowchart corresponding to steps S39–S41 in the regular welding in FIG. 15. When the separation detection signal is issued by the separation detector 83 (step S101, S102), the charge amount Q is reset and then the charge amount after separation is detected. If the charge amount exceeds the predetermined value Qo, the minimum base current $I_B(m,n)$ is outputted (step S105). After separation, the program jumps to step S104. If the answer is NO at step S102 or S104, the program proceeds to S106 or S107, respectively, where the respective parameters are corrected. At step S108, the charge amount Q is corrected according to the equation $Q=Q+Ip(m,n)\tau(m,n)$. The rest of flowchart is the same as that in FIG. 15.

In addition to the effects derived from the third and fourth inventive aspects, the sixth inventive aspect has the advantage that the charge amount of current over a time length after separation is detected and then the current is reduced when the thus detected charge amount reaches the predetermined value. Thus, the amount of globule during separation may be maintained nearly constant allowing welding operation in more regular manner.

A specific embodiment of a seventh inventive aspect will now be described. The seventh inventive aspect is a pulse welding apparatus of the construction in FIG. 9 with the short-circuit detector 82, the separation detector 83, and the short-circuit current waveform memory 87 removed. The calculating unit 88 has the algorithm which has a storage means which operates to write the target arc length signal into the aforementioned target arc length memory 86 for storage, the target arc length being corrected and learned on the basis of the detected arc length signal when welding is performed by the current waveform on the basis of the predetermined arc current waveform parameters, and a control means which controls the arc current waveform parameters to increase or decrease in accordance with the difference between the aforementioned detected arc length signal and the learned target arc length signal.

The operation of the seventh inventive aspect will now be described with reference to the flowchart of the calculating unit 88 in FIGS. 19 and 20.

Figure 19:
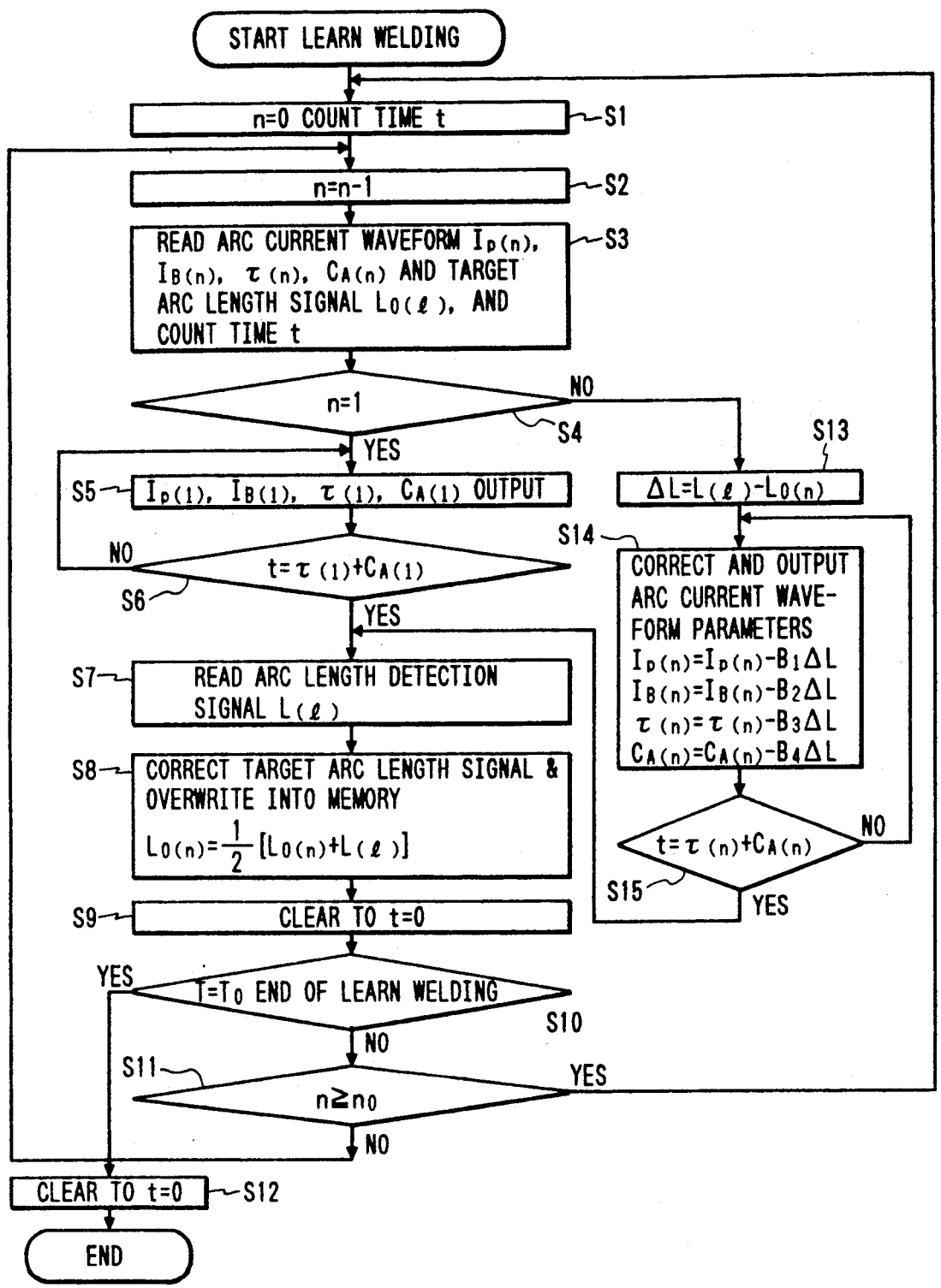
FIG. 19 and FIG. 20 are flowcharts of the calculating unit (88) when the first and second welding stages according to the seventh inventive aspect are performed.

FIG. 19 shows the flowchart of the first welding stage as learning welding. The welding is performed on the basis of the pulse current waveform parameters stored in the arc current waveform memory 85 defined via the external input/output port 9. The target arc length signal Lo(n) is corrected according to the equation $Lo(n)=\frac{1}{2}[Lo(n)+L(l)]$ on the basis of the detected arc length signal L(l) detected during the welding. Then, the target arc length signal Lo(n) is written into the target arc length memory 86. FIG. 20 shows the flowchart of the second welding stage as the regular welding. In the figure, the learned target arc length signal which has been written into the target arc length memory 86 in the aforementioned first welding stage, and the arc waveform parameters are controlled to increase or decrease in accordance with the difference between the detected arc length signal and the learned target arc length signal.

In the first welding stage as the learning welding shown in FIG. 19, the respective parameters of pulse current group Ip(n), $I_B(n)$, $\tau(n)$, $C_A(n)$, and target arc length Lo(n) are inputted into the arc current waveform memory 85 and the target arc length memory 86 via the external input/output port 9.

With this condition, the calculating unit 88 sets the iterative loop to n=1 (step S1, S2), reads the arc current waveform parameters Ip(n), $I_B(n)$, $\tau(1)$, $C_A(1)$, and Lo(1) from the arc current memory 85 and the target arc length memory 86 (step S3), and outputs the welding current corresponding to these parameters to the comparator 89 (step S4, S5).

The comparator 89 supplied with the pulse current lo from the calculating unit 88 in this manner, sends an ON signal to the inverter drive circuit 2 so that the inverter drive circuit 2 transmits the inverter drive signal to the inverter circuit 1 to drive it. Driving the inverter causes the shaped alternating waveform to be outputted to the high frequency transformer 3, which in turn supplies an output to the high frequency diodes 4A and 4B by which the signal is converted into a DC waveform. Thereby, the pulse arc current i is supplied to the arc load unit 5. This pulse arc current i produces the pulse arc discharge 53 across the wire electrode 52 and the workpieces 54 to melt both the workpieces 54 and the tip end of wire electrode 52 by the pulse arc discharge.

The arc length detector 81 detects the arc length L(l) on the basis of the detection signal I of the current detector 6 and the detection signal V of the voltage detector 7 so as to output the detection signals to the calculating unit 88. When the supply of arc current has been completed for n=1, i.e., when the $t=\tau(1)+C_A(1)$ is satisfied (step S6), the calculating unit 88 reads the aforementioned detected arc length L(l) (step S7), and corrects the target arc length signal Lo(n) according to the equation below while also updating the target arc length Lo(n) in the target arc length memory 86 (step S8).

Then the program goes through steps S9-S11 and clears the time to t=0 and then returns to step S2 where the iterative loop of the pulse group is updated to n=2. If n≧2, the arc current waveform parameters and the target arc length detection signal are read in at step S3 so as correct the arc current waveform parameters on the basis of the difference ΔL between the arc length detection signal L(l) and the target arc length signal Lo(n) (step S13, S14).

$$Ip(n)=Ip(n)-B_1\Delta L$$

$$I_b(n)=I_B(n)-B_2\Delta L$$

$$\tau 9n)=\tau(n)-B_3\Delta L$$

$$C_A(n)=C_A(n)-B_4\Delta L$$

($B_4$-$B_4$ are proportional constants)

When the difference ΔL is determined, the previous value of the difference ΔL for (n−1) is used as the arc length detection signal L(l). Then, the pulse is outputted in accordance with the arc current waveform parameters corrected as mentioned above (step S14, S15). Then, the program returns to step S7 where the arc length detection signal L(l) is read in accordance with the pulse output so as to update the target arc length signal stored in the target arc length memory 86 at step S8. The above-mentioned signal processing is iterated till $n=n_o$ for the respective pulse current groups (step S10-S12).

The target arc length signal stored in the target arc length memory 86 in the first welding stage is stored as a learned target arc length signal taking the magnetic blow into account, and serves to eliminate the effect of the changes of arc length on welding quality due to magnetic blow and to control the faulty separation of globules.

Figure 20:
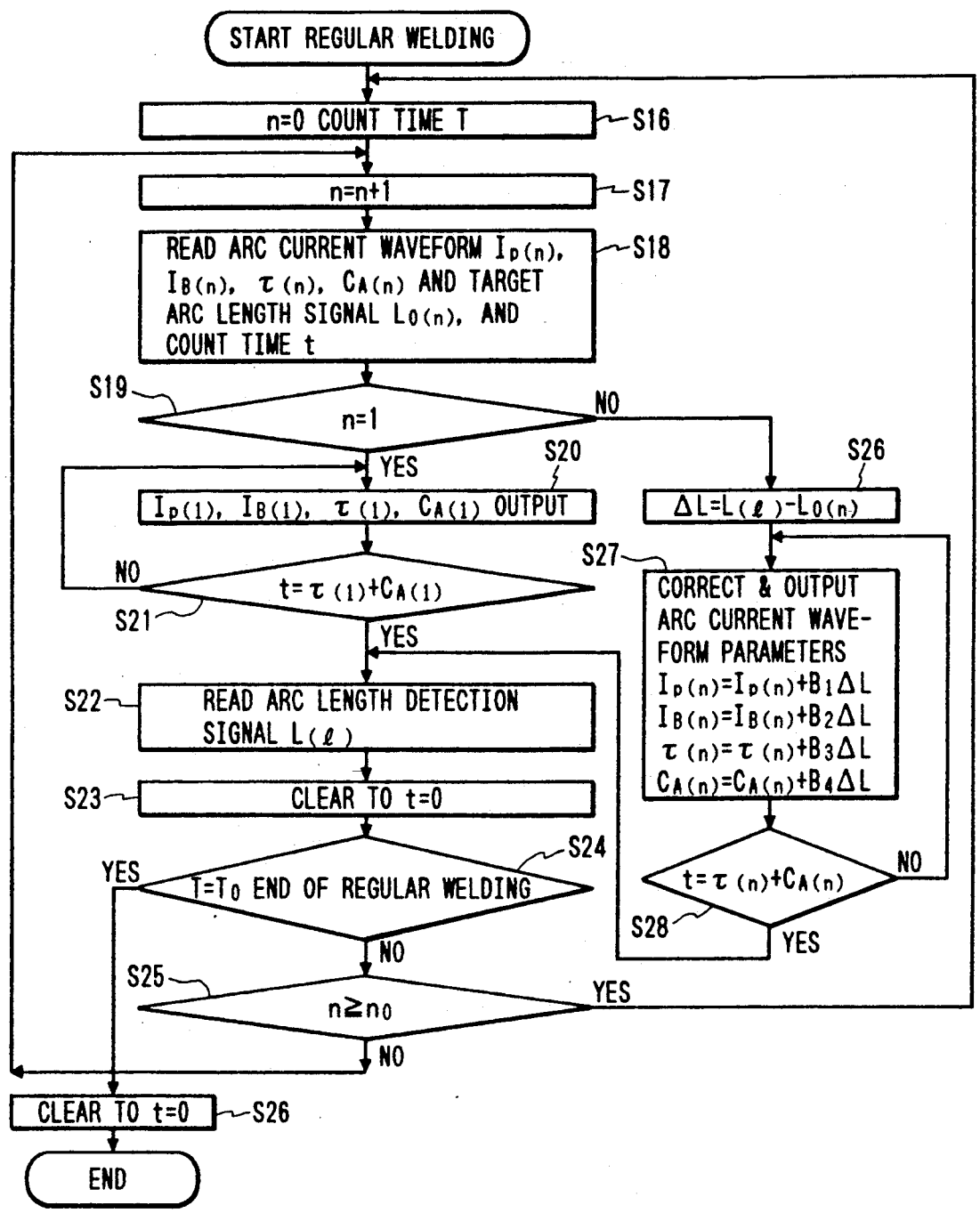

The welding operation shifts to the regular welding as the second welding stage as shown in FIG. 20 after the learning welding as the first welding stage. The regular welding shown in FIG. 20 has the substantially the same flowchart as the learning welding shown in FIG. 19, the program reads out the target arc length Lo(n) learned in the learned welding and stored in the target arc length memory 86, the step S8 in FIG. 19 is deleted, and at step S27 similar to step S14 the aforementioned arc current waveform parameters are corrected in accordance with the difference L between the previous arc length detection signal L(l) and the target arc length signal Lo(n), and the pulses are outputted on the basis of the thus corrected parameters.

$$IP(n)=Ip(n)-B_1\Delta L$$

$$I_b(n)=I_B(n)-B_2\Delta L$$

$$\Delta(n)=\Delta 9n)-B_3\Delta L$$

$$C_A(n)=C_A(n)-B_4\Delta L$$

($B_1$-$B_4$ are proportional constants)

Thus, in the regular welding as the second welding stage, the current waveform is controlled so as to produce the same arc length signal as the target arc length which is learned in the first welding stage. This is effective in controlling the faulty separation of globules due to external disturbances occurring at the welding torch for improved welding quality under various welding environments.

In addition to the effects derived from the first and second inventive aspect, the embodiment of the seventh inventive aspect is advantageous in that the effect of magnetic blow on the arc length variation is eliminated in the first welding stage, the faulty separation of globules due to the magnetic blow is controlled, and the target arc length signal learned taking the magnetic blow into account in the respective welding regions is obtained, the variations of the arc lengths due to external disturbances occurring in the magnetic blow are controlled for improved welding quality under various welding environments.

A specific embodiment of an eighth inventive aspect will now be described. The eighth inventive aspect is a pulse welding apparatus of the same construction as in FIG. 9 with the separation detector 83 removed. The calculating unit 88 has an algorithm in which for performing the regular welding as the second welding stage in accordance with the waveform parameters of welding current learned in the first welding stage, when the short-circuit is detected by the short-circuit detector 82, the short-circuit current is read out from the short circuit current waveform memory 87 for supplying current, in which memory the short-circuit current Is(S) supplied during short-circuit period and the time duration $\tau s(S)$ are stored.

That is, in the short-circuit current waveform 87 are stored the stair-case like short-circuit current Is(S) whose value increases gradually and the time duration $\tau s(S)$ (S=1,2, ..., So) by means of the external input-/output port 9. Through interruption handling routine, in performing the second welding stage, when the calculating unit 88 receives the short-circuit detection signal from the short-circuit detector 82 (step S81), the unit 88 reads the short-circuit current Is(S) and the time duration $\tau s(S)$ of Is(S) from the aforementioned short-circuit current waveform memory (87) and continues to supply the short-circuit current whose amplitude is increased in step wise through the iterative loop S till the short-circuit is removed. Then, after the short-circuit is removed, the program returns to the control immediately before the regular welding in FIG. 20 (step S82–S86).

In the eighth inventive aspect, a predetermined current waveform is divided into the short-circuit current waveform and the arc current waveform, and the arc current waveform is switched to the short-circuit current waveform when a sudden short-circuit occurs due to external disturbances during the regular welding. Thus, in addition to the effect derived from the seventh inventive aspect, the eighth inventive aspect ensures good welding and the quality of products.

An embodiment of a ninth inventive aspect will be described. The ninth inventive aspect is a pulse welding of the construction in FIG. 9 without the separation detector 83. The calculating unit 88, during the regular welding as the second welding stage performed in accordance with the waveform parameters of welding current learned in the first welding, when the short-circuit is detected by the short-circuit detector 82, the short-circuit current is read out from the short-circuit current waveform memory 87 where the short-circuit current Is(S) of stair-case waveform supplied during the short-circuit and the time duration $\tau s(S)$ are stored. After short-circuit is removed, the arc current waveform is reset before resuming the supply of arc current waveform.

That is, the time-duration $\tau s(S)$ (S=1, 2, ..., So) and the short-circuit current Is(S) in the form of stair-case where current increases in steps, are stored into the short-circuit current waveform memory 87 through the external input/output port 9. During the second welding stage, when the calculating unit 88 receives the short-circuit detection signal generated through handling operation for short-circuit in FIG. 22 (step S91), the calculating unit 88 reads in the short-circuit current Is(S) and the time-duration $\tau s(S)$ from the short-circuit current waveform memory 87, continues to supply the short-circuit current whose amplitude increases insteps, by updating the iterative loop S till short-circuit is removed. After the short-circuit is removed, the arc current waveform is reset before supplying arc current waveform for n=0 in the regular welding shown in FIG. 20 (steps S92–S97).

Thus, in the ninth inventive aspect, the short-circuit current is run immediately when the short-circuit occurs, and after the short-circuit is removed, the arc current is reset before resuming the arc current waveform. Thus, the same effects as in the seventh inventive aspect can be obtained in the short-circuit through arc welding as well.

An embodiment of a tenth inventive aspect will be described. The tenth inventive aspect has the entire construction shown in FIG. 9. During the regular welding as the second welding stage performed in accordance with the waveform parameters of welding current learned in the first welding stage of the seventh and eighth inventive aspects, the calculating unit 88 receives the detection signal from the separation detector 83 for detecting the separation of globules produced on the tip of wire electrode, and detects the charge amount of current after separation so that the minimum base current is supplied when the charge amount exceeds a predetermined value.

Figure 23:
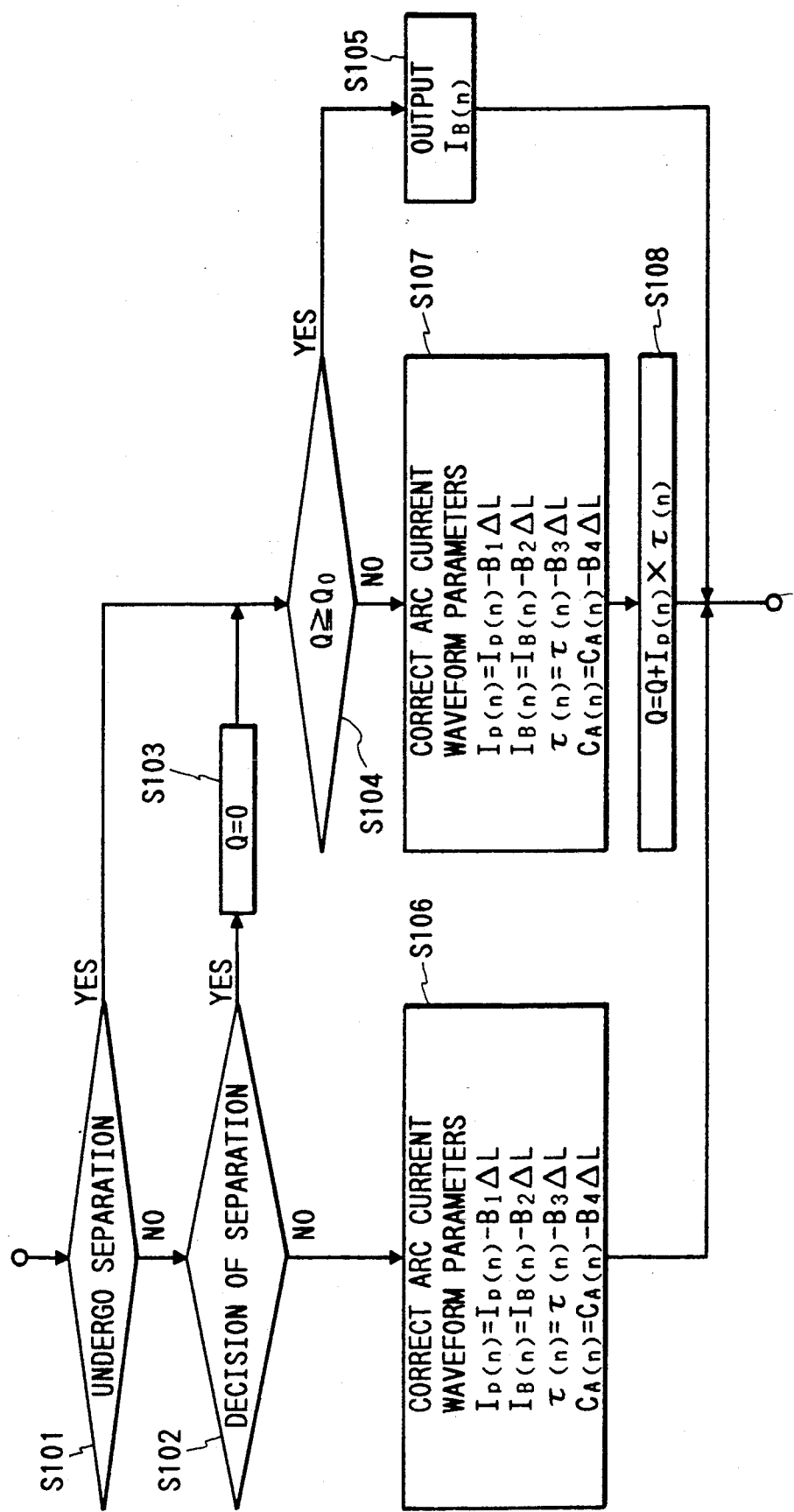
FIG. 23 is a flowchart of the calculating unit (88) according to a tenth inventive aspect.
Figure 24A:
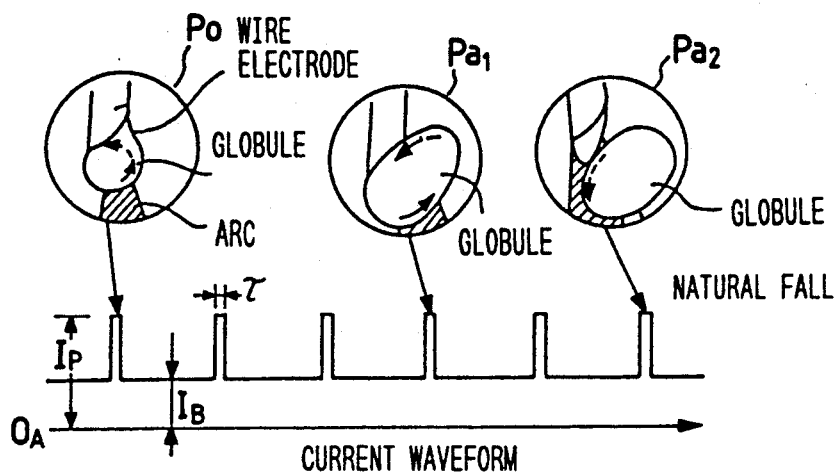
FIGS. 24(a) and 24(b) are illustrative diagrams of a prior art pulse arc discharge current waveform and the transfer of globules.
Figure 24B:
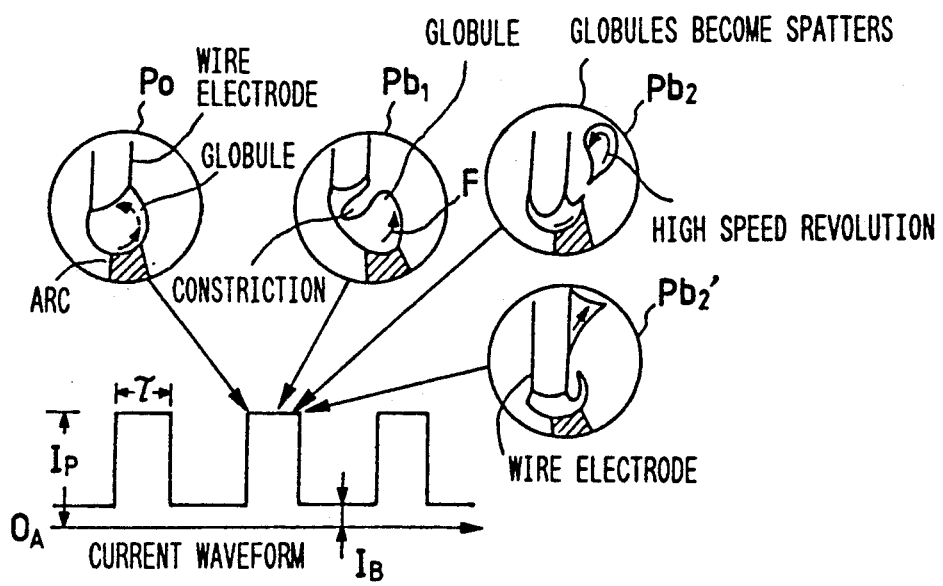
Figure 25:
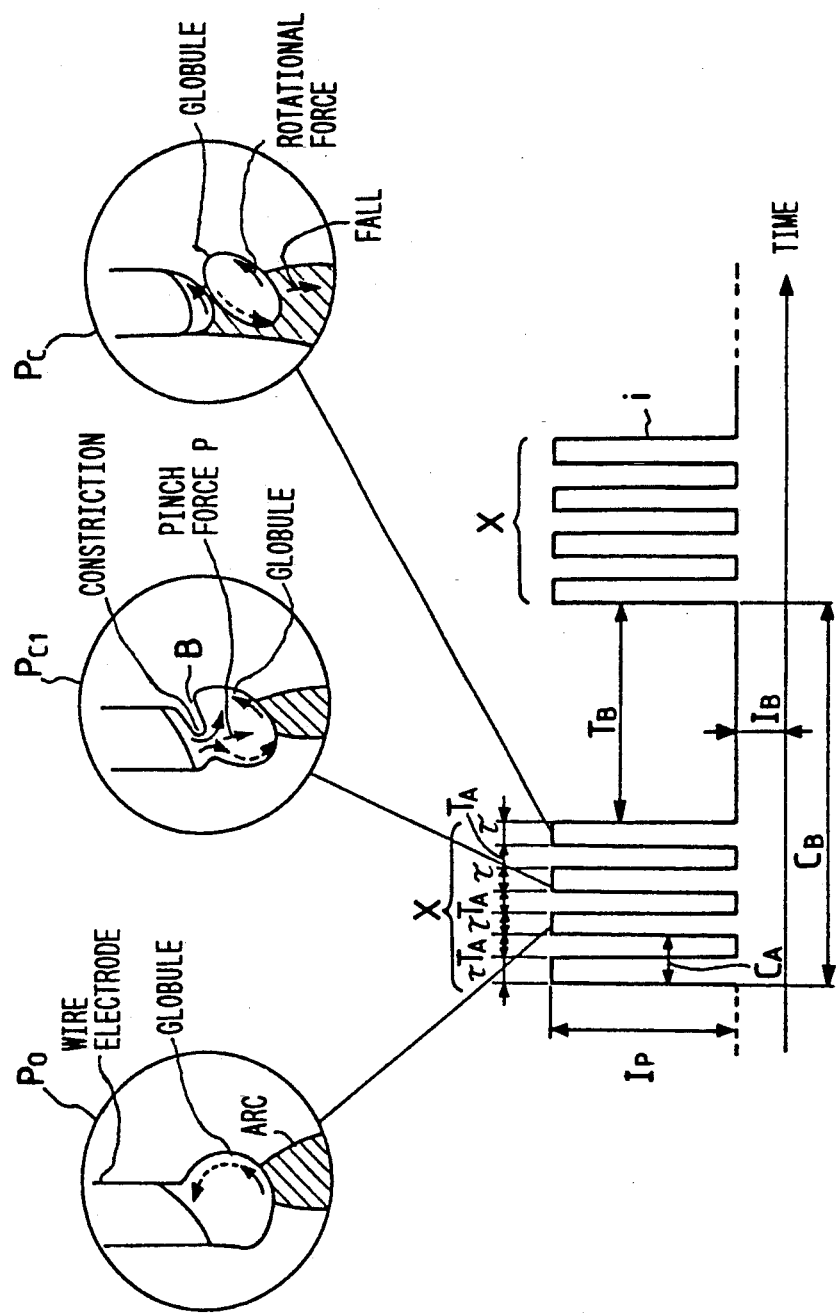
FIG. 25 shows the operation and effects of a prior art pulse current group.
Figure 26:
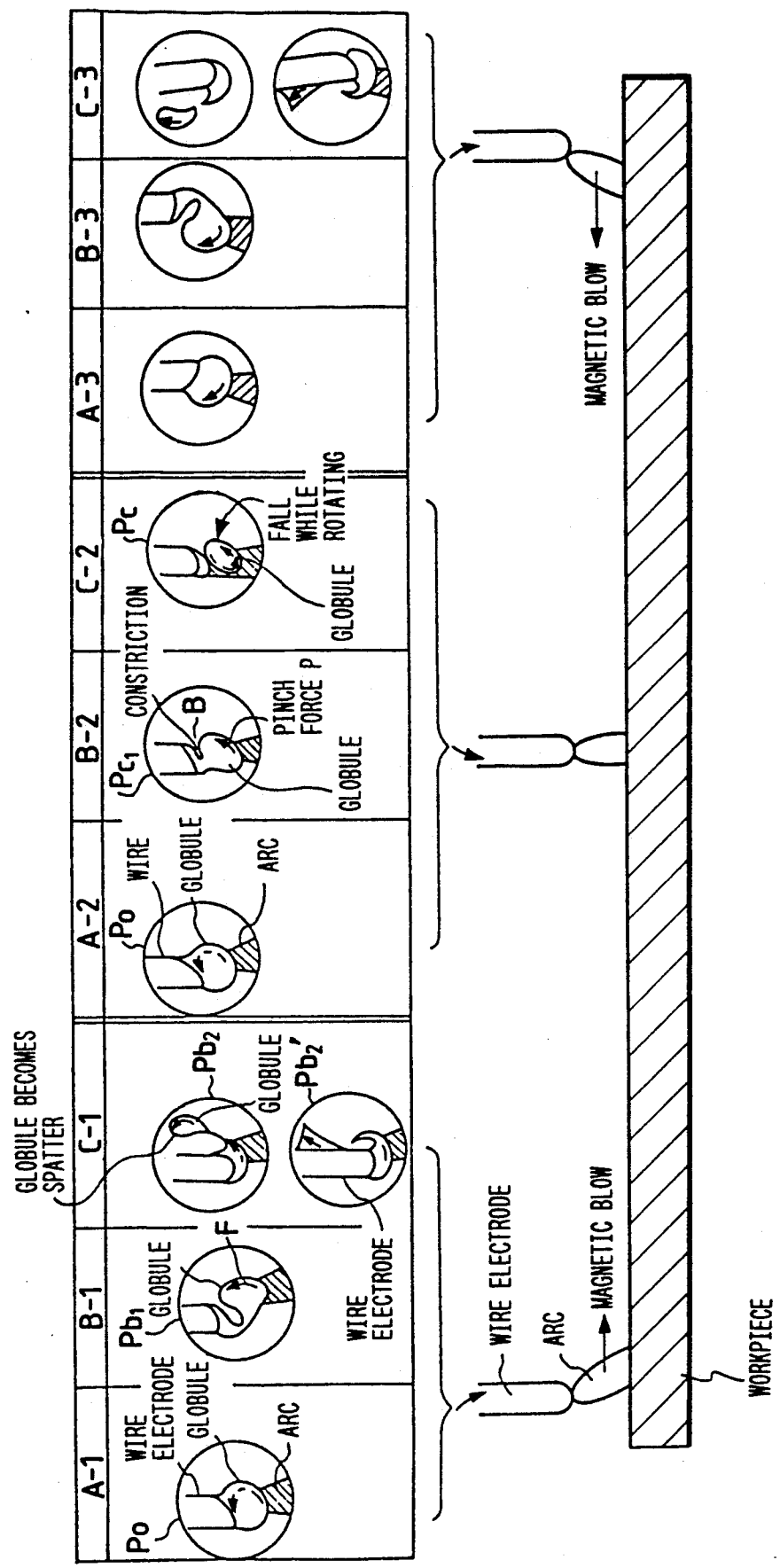
FIG. 26 is an illustrative diagram of magnetic blow.
Figure 27A:
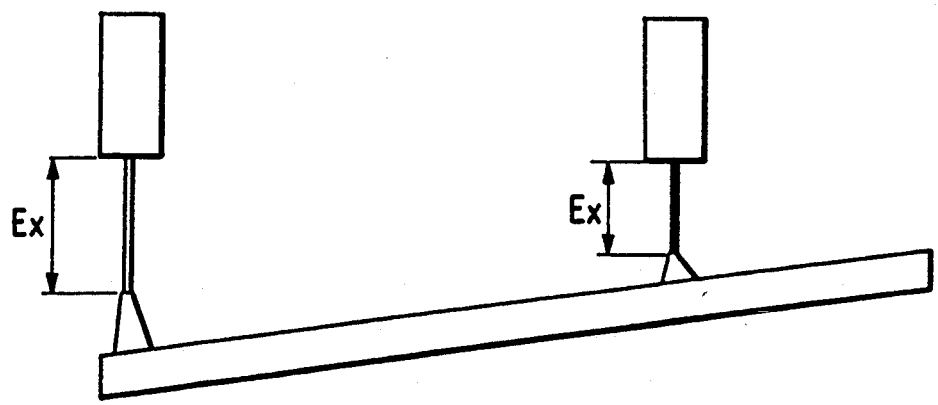
FIGS. 27(a), 27(b) and 27(c) are illustrative diagrams of the variation of the welding conditions.
Figure 27B:
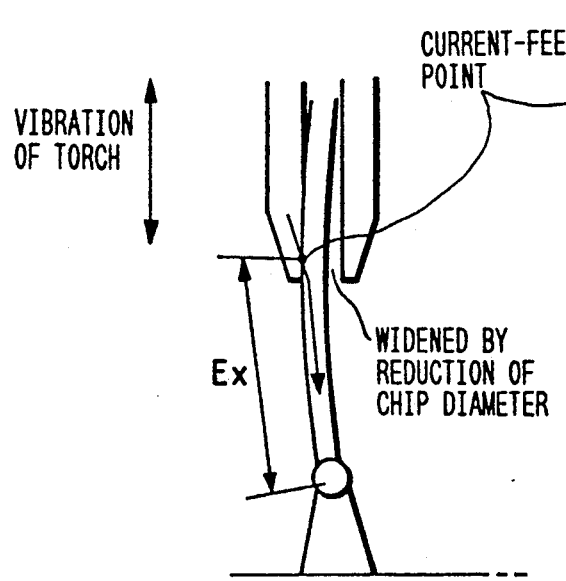
Figure 27C:
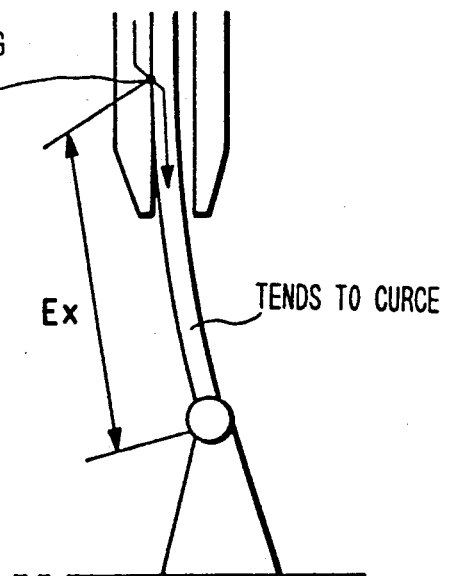
Figure 28:
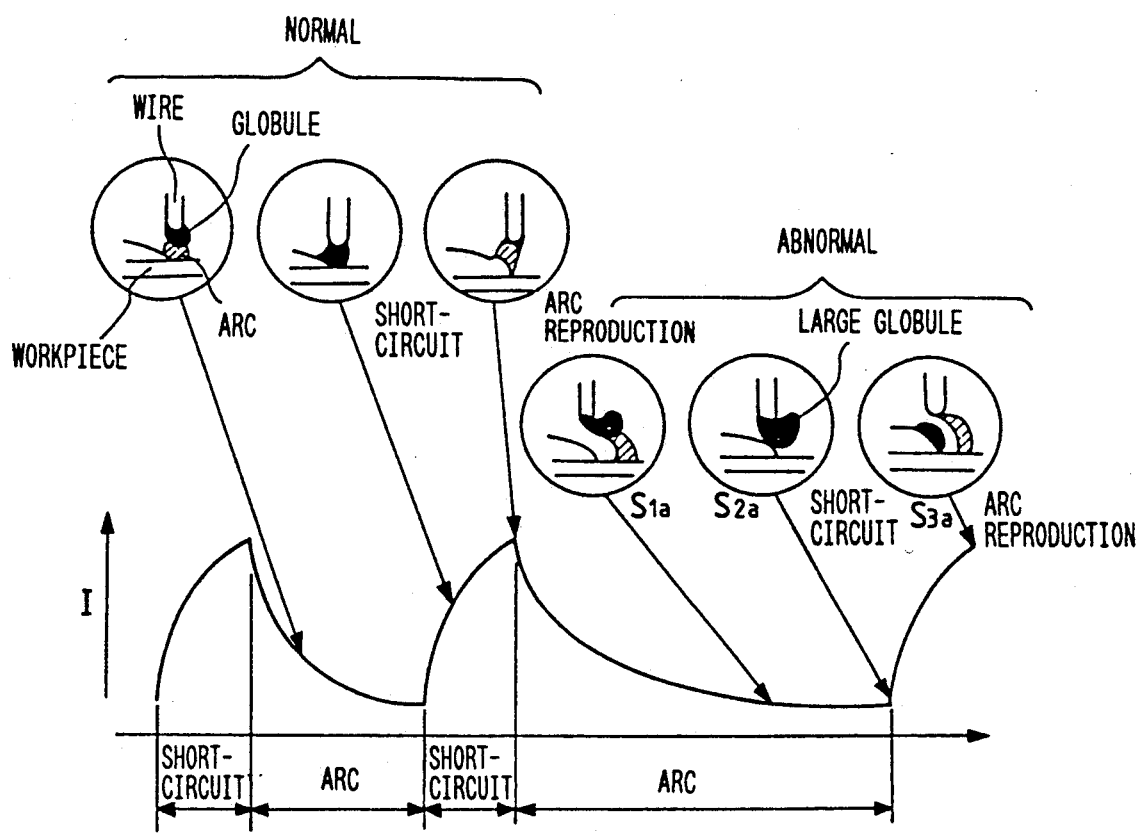
FIG. 28 is a diagram showing the current waveform and the transfer of globule in a prior art short-circuit arc welding method.

That is, FIG. 23 shows a flowchart corresponding to step 27 of the regular welding shown in FIG. 20. When the calculating unit 88 receives the separation signal from the separation detector 83 (step S101, S102), the unit 88 resets the charge amount Q to detect the charge amount after separation, and if the predetermined value Qo is exceeded, the minimum base current $I_B(n)$ is outputted (step S105). After undergoing separation, the program jumps from step S101 to S104. If the answer at step S102 or S103 is "NO", then the program proceeds to step S106 or S107 where the respective parameters are corrected. Then, at step S108, the charge amount Q is corrected according to $Q = Q + Ip(n) \times \tau(n)$.

Thus, in addition to those derived from the seventh and eighth inventive aspects, the tenth inventive aspect has advantages that the charge amount of current after separation occurs is detected, and the current is reduced when the detected charge amount reaches a predetermined value. Thus, the amount of globule during separation can be controlled to be substantially constant for performing welding in a regular fashion.

What is claimed is:

1. A pulse welding apparatus in which pulse currents for melting a workpiece are supplied alternately with a base current or with a short-circuit current to a welding load so as to perform welding operation, the apparatus comprising:

an arc welding power supply unit for supplying said pulse currents to the welding load, in which one waveform of said pulse currents is further divided into a group of pulse currents which has at least one pulse width and at least one pulse interval, which is obtained to periodically repeat said group of pulse currents and to superpose with a continuous base current;

a voltage detecting circuit for detecting the output of said arc welding power supply unit;

a smoothing circuit for receiving the output signal of said voltage detecting circuit;

a voltage setting circuit for setting a desired output voltage; and a microcomputerized digital circuit including a digital/analog converter circuit for outputting a voltage signal corresponding to a desired output current to said arc welding power supply unit, a first analog/digital converter circuit for receiving the output signal of said voltage setting circuit, a second analog/digital converter circuit for receiving the output signal of said smoothing circuit, a data latch circuit having multiple bits output signal lines connected with multiple bits input signal lines of the digital/analog converter circuit, a CPU connected, via a common data bus, to each of said multiple bits input signal lines of the data latch circuit, said multiple bits output signal lines of the first analog digital converter circuit, and said multiple bits output signal lines of the second analog digital converter circuit; wherein said CPU operates, when said arc welding power supply unit outputs the base current or the short-circuit current, such that a digital data $V_{FBA}$ corresponding to an average output voltage of the arc welding power supply unit is compared with a digital data Vset corresponding to a desired output voltage at predetermined time intervals so as to maintain the base current or the short-circuit current or to output a melting current for the workpieces instead of the base current or the short-circuit current.

2. A pulse welding apparatus according to claim 1, wherein said CPU is a single chip CPU which incorporates said first and second analog/digital converting circuits.

3. A pulse welding apparatus according to claim 1, wherein said CPU is a single chip CPU which incorporates a ROM.

4. A pulse welding apparatus according to claim 1, wherein said CPU is a single chip CPU which incorporates said first and second analog/digital converting circuits and said ROM.

5. A pulse welding apparatus according to any one of claims 1, 2, 3, or 4, wherein said apparatus further includes:
   a third analog/digital converter circuit receiving the output of the voltage detecting circuit and having a multiple bits signal lines connected to the data bus, and
   said CPU, when the arc welding power supply unit outputs the base current or short-circuit current, performing operations according to an algorithm at predetermined intervals, having another algorithm in which a digital data $V_{FBM}$ corresponding to a momentary output voltage of the arc welding power unit is compared with a digital data Vmax in which the character is Vmax > Vset corresponding to the predetermined digital data Vset, so as to maintain the base current or the short-circuit current when $V_{FBM}$ > Vmax and output a second base current or a second short-circuit current greater than the base current or the short-circuit current only when $V_{FBM} \geq$ Vmax.

6. A pulse welding apparatus according to claim 5, wherein said CPU is a single chip CPU having the third analog digital converting circuit incorporated.

* * * * *